(12) United States Patent
Tamaki et al.

(10) Patent No.: US 8,566,070 B2
(45) Date of Patent: Oct. 22, 2013

(54) APPARATUS ABNORMALITY MONITORING METHOD AND SYSTEM

(75) Inventors: Kenji Tamaki, Kawasaki (JP); Toshiharu Miwa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 43 days.

(21) Appl. No.: 13/377,242

(22) PCT Filed: May 13, 2010

(86) PCT No.: PCT/JP2010/058104
§ 371 (c)(1),
(2), (4) Date: Jan. 26, 2012

(87) PCT Pub. No.: WO2010/143492
PCT Pub. Date: Dec. 16, 2010

(65) Prior Publication Data
US 2012/0136629 A1    May 31, 2012

(30) Foreign Application Priority Data

Jun. 11, 2009   (JP) .................... 2009-139873

(51) Int. Cl.
*G06G 7/48* (2006.01)
(52) U.S. Cl.
USPC .................................. 703/6; 703/2; 702/183
(58) Field of Classification Search
None
See application file for complete search history.

(56) References Cited

U.S. PATENT DOCUMENTS

| | | | |
|---|---|---|---|
| 7,209,846 B2 | 4/2007 | Tamaki et al. | |
| 7,937,164 B2* | 5/2011 | Samardzija et al. | 700/28 |
| 8,032,341 B2* | 10/2011 | Miller | 703/2 |
| 8,229,584 B2* | 7/2012 | Higashide et al. | 700/110 |
| 2007/0225853 A1 | 9/2007 | Matsushita et al. | |
| 2009/0150119 A1 | 6/2009 | Ikegami | |
| 2011/0276828 A1* | 11/2011 | Tamaki et al. | 714/26 |

FOREIGN PATENT DOCUMENTS

| | | |
|---|---|---|
| JP | 2000-252180 | 9/2000 |
| JP | 2002-110493 | 4/2002 |
| JP | 2007-242809 | 9/2007 |
| WO | WO 2006/049084 A1 | 5/2006 |

OTHER PUBLICATIONS

J. M. Chambers et al., Statistical Models in S, Chapman & Hall/CRC (1991), Chapter 6: Generalized Linear Models, Chapter 7: Generalized Additive Models, Chapter 10: Nonlinear Models.
T. Hastie, et al., The Elements of Statistical learning, Springer (2003), Chapter 3: Linear Methods for Regression.
Richard G. Brereton et al., Chemometrics, Data Analysis for the Laboratory and Chemical Plant, Wiley (2003), Chapter 5:5.5 Partial Least Squares.
Christopher M. Bishop, Pattern Recognition and Machine Learning, Springer (2006), Chapter 8: Graphical Models. http://research.microsoft.com/~cmbishop/PRML.

* cited by examiner

*Primary Examiner* — Omar Fernandez Rivas
*Assistant Examiner* — Herng-Der Day
(74) *Attorney, Agent, or Firm* — Antonelli, Terry, Stout & Kraus, LLP.

(57) ABSTRACT

The present invention relates to an apparatus abnormality monitoring method, and it provides a technology that can achieve accurate abnormality detection, cause diagnosis, and others. This system relates to monitoring of a newly-installed apparatus (T) among a plurality of similar apparatuses 1. In a judgment model creation module 2, for each of a plurality of (K) already-installed similar apparatuses (a, b and others), individual judgment models (prediction models) are created, and a meta prediction model for predicting a coefficient and an intercept of these prediction models from feature item values and others of each of the apparatuses 1 is created. From this meta prediction model, a prediction model dedicated to the apparatus (T) (judgment model including the prediction model) is produced. By using this judgment model, a judgment module 3T monitors the state of the apparatus (T) to perform abnormality detection.

8 Claims, 21 Drawing Sheets

FIG. 5A

|        | P1(XC1) | P2(XC2) | P3(XD) | P4(Y) |
|--------|---------|---------|--------|-------|
| P1(XC1)| 1       | 0.9     | 0.1    | 0.8   |
| P2(XC2)| 0.9     | 1       | 0.1    | 0.9   |
| P3(XD) | 0.1     | 0.1     | 1      | 0.2   |
| P4(Y)  | 0.8     | 0.9     | 0.2    | 1     |

FIG. 5B

| PARAMETER / CLASSIFICATION | P1(XC1) | P2(XC2) | P3(XD) | P4(Y) | ... |
|----------------------------|---------|---------|--------|-------|-----|
| OBJECTIVE VARIABLE (Y)     | 0       | 0       | 0      | 1     | ... |
| EXPLANATORY VARIABLE (X)   | 1       | 1       | 1      | 0     | ... |
| COLLINEARITY (C)           | 1       | 1       | 0      | —     | ... |
| INDEPENDENCE (D)           | 0       | 0       | 1      | —     | ... |

FIG. 6A

| MODEL NAME \ PARAMETER | INTERCEPT | P1(XC1) | P2(XC2) | P3(XD) | P4(Y) |
|---|---|---|---|---|---|
| INDIVIDUAL-APPARATUS (a) PREDICTION MODEL #1 (Ma#1 : MaXC1) | 0.1 | 1.2 | — | 0.9 | — |
| INDIVIDUAL-APPARATUS (a) PREDICTION MODEL #2 (Ma#2 : MaXC2) | 0.4 | — | 1.7 | 1.1 | — |

FIG. 6B

| MODEL NAME \ PARAMETER | INTERCEPT | P1(XC1) | P2(XC2) | P3(XD) | P4(Y) |
|---|---|---|---|---|---|
| INDIVIDUAL-APPARATUS (b) PREDICTION MODEL #1 (Mb#1 : MbXC1) | 0.2 | 2.4 | — | 1.8 | — |
| INDIVIDUAL-APPARATUS (b) PREDICTION MODEL #2 (Mb#2 : MbXC2) | 0.83 | — | 3.4 | 2.2 | — |

|  | GASOLINE ENGINE | DIESEL ENGINE | GAS ENGINE |
|---|---|---|---|
| APPARATUS (a) | 1 | 0 | 0 |
| APPARATUS (b) | 0 | 0 | 1 |
| APPARATUS (c) | 0 | 1 | 0 |
| ⋮ | ⋮ | ⋮ | ⋮ |

OPERATING TIME (t) OF APPARATUS (m)

OPERATING TIME (t) OF APPARATUS (m)

FIG. 18

| 135 | | DETAILS | |
|---|---|---|---|
| 137 | APPARATUS FEATURE ITEM | TYPE OF DRIVING ENGINE | AVERAGE TEMPERATURE AT INSTALLATION LOCATION |
| | | LOGICAL CYCLE OF HEAT ENGINE | AVERAGE HUMIDITY |
| | | USE FUEL | AVERAGE AIR PRESSURE |
| | | NUMBER OF ENGINE CYLINDERS | |
| | | RATED OUTPUT OF ELECTRIC GENERATOR | |
| | | RATED REVOLUTIONS | |
| | | RATED FREQUENCY | |
| | | RATED VOLTAGE | |
| | | RATED CURRENT | |

136 — DIFFERENCE DIAGNOSTIC MODEL

CAUSE:
- ABNORMALITY OF P1 (XC1)
- ASSOCIATED PARTS OF P1: {part11, part12, · · · }    — 136c NORMAL DIFFERENCE MODEL:
- 131 — P1 (XC1) — EXPLANATORY VARIABLE COLLINEARITY DATA ITEM
- 0.9 → 132 P2 (XC2) EXPLANATORY VARIABLE COLLINEARITY DATA ITEM
- 0.8 → 134 P4(Y) OBJECTIVE VARIABLE DATA ITEM
— 136a ABNORMAL DIFFERENCE MODEL:
- 131 — P1 (XC1) EXPLANATORY VARIABLE COLLINEARITY DATA ITEM
- 0.5 → 132 P2 (XC2) EXPLANATORY VARIABLE COLLINEARITY DATA ITEM
- 0.45 → 134 P4(Y) OBJECTIVE VARIABLE DATA ITEM
— 136b

APPARATUS ABNORMALITY MONITORING METHOD AND SYSTEM

TECHNICAL FIELD

The present invention relates to an apparatus abnormality monitoring method for monitoring the states of one or more apparatuses to make a judgment of abnormality (abnormality sign) or normality and diagnose the cause of the abnormality (failure), and others. In particular, the present invention relates to technologies of monitoring and diagnosis targeted for a plurality of apparatuses.

BACKGROUND ART

There is a technology of Condition Based Maintenance (CBM) in which, by mounting a plurality of sensors (measurement devices) for measuring a state on an energy conversion apparatus (facility) or the like which converts fuel to at least kinetic energy, thermal energy or electric energy typified by a combined heat and power (cogeneration) apparatus, each state of the apparatus is measured and grasped at every moment to judge normality or abnormality of the state of the apparatus based on the data from the sensors (referred to as apparatus state measurement data, sensor data or the like), thereby performing maintenance in consideration of the abnormal state. This is effective in reducing maintenance cost.

Japanese Unexamined Patent Application Publication No. 2002-110493 (Patent Document 1) and Japanese Unexamined Patent Application Publication No. 2000-252180 (Patent Document 2) describe a method of a multistage multivariate analysis for quality variation cause analysis on manufacturing line, in which a plurality of explanatory variables are divided into groups including a predetermined small number of variables, linear multiple regression model creation ($Y_i = A \cdot X_i$) is applied to all divided groups to narrow down the explanatory variables in each divided group with a forward selection method, the narrowed-down explanatory variables are combined and multiple regression model creation is applied again, and these steps are repeated in multiple stages.

U.S. Pat. No. 7,209,846 (U.S. Pat. No. 7,209,846 B2) (Patent Document 3) describes a method of performing a causal analysis between product quality on a manufacturing line and process data by using a graphical model.

Non-Patent Document 1 describes statistical models. Specifically, a GLM (Generalized Linear Model) method, a GAM (Generalized Additive Model) method, and a nonlinear model method are described.

Non-Patent Document 2 describes a plurality of methods for creating a degenerate linear regression model ($Y = A \cdot X$) of an objective variable (Y) and an explanatory variable (X) based on a Projection Method for avoiding a non-computable problem or insufficient accuracy due to a Multiple Co-linear phenomenon caused by simultaneous fluctuations of a plurality of elements of the explanatory variables. Specifically, a PLS (Partial Least Squares) method, a PCR (Principal Component Regression) method, a Ridge method, and a Lasso method are described. Also, as a nonlinear relation model creating method, a nonlinear regression method is described. Specifically, a GLM (Generalized Linear Model) method and a MARS (Multivariate Adaptive Regression Splines) method are described. Also, as a sampling method for finding a model coefficient in combination with a Bayes method, a MCMC (Markov Chain Monte Carlo) method is described.

Non-Patent Document 3 describes a method of constructing a linear regression prediction model by mixing data items having collinearity by using a PLS (Partial Least Squares) method.

Non-Patent Document 4 describes a method of a statistical mathematical general algorithm performing a causal analysis by using a graphical model.

PRIOR ART DOCUMENTS

Patent Documents

Patent Document 1: Japanese Unexamined Patent Application Publication No. 2002-110493
Patent Document 2: Japanese Unexamined Patent Application Publication No. 2000-252180
U.S. Pat. No. 7,209,846 (U.S. Pat. No. 7,209,846 B2)

Non-Patent Documents

Non-Patent Document 1: ISBN: 978-0412830402 J. M. Chambers and T. J. Hastie, "Statistical Models in S", Chapman & Hall/CRC (1991), Chapter 6: Generalized Linear Models, Chapter 7: Generalized Additive Models, Chapter 10: Nonlinear Models
Non-Patent Document 2: ISBN:978-0387952840,T. Hastie, R. Tibshirani, and J. H. Friedman, "The Elements of Statistical Learning", Springer (2003), Chapter 3: Linear Methods for Regression
Non-Patent Document 3: ISBN: 0-471-48978-6,Richard G. Brereton, "Chemometrics, Data Analysis for the Laboratory and Chemical Plant", WILEY (2003), Chapter 5: 5.5 Partial Least Squares
Non-Patent Document 4: ISBN: 978-0387310732,Christopher M. Bishop, "Pattern Recognition and Machine Learning", Springer (2006), Chapter 8: Graphical Models

SUMMARY OF THE INVENTION

Problems to be Solved by the Invention

To effectively perform the Condition Based Maintenance (CBM) described above, it is required to recognize an abnormality sign before a failure develops. To do this, a method in which a model that consolidates data items of a plurality of sensors by statistical analysis is created, a deviance on the basis of a model in a normal state of an apparatus is calculated, and the deviance is set as a state judgment reference is effective.

Most of modules each constituting the target apparatus and parts constituting each module operate in conjunction with each other so that the apparatus achieves an object such as energy conversion. Thus, most of outputs (data items) of the plurality of sensors installed for the plurality of parts constituting the apparatus are also changed in conjunction with each other. In this case, when a parameter space in which a data item of each sensor is taken as an axis is assumed, an apparatus normal state forms a localized partial space. If this parameter partial space of the apparatus normal state is modeled by statistical analysis, a deviance for judging an abnormal state can be calculated.

Also, if a relation among the sensor outputs (data items) changing in conjunction with each other at a time of normal condition and a relation among the sensor outputs (data items) changing in conjunction with each other at a time of abnormal condition are compared and modeled, a cause of an abnormality (failure) can be diagnosed at a time of abnormal condition.

In relation to the technologies described above, there are problems (first and second problems) as described below.

(First Problem: Deficiency in the Number of Pieces of Data)

Firstly, there is a problem that data collection for creating a model in a normal state to be a reference for abnormality judgment takes time. To create a model (judgment model) that consolidates data items of a plurality of sensors by statistical analysis, a statistically sufficient number of sampling pieces or a number of sampling pieces that covers all apparatus state fluctuations in a stationary state are required. However, there is a problem that abnormality monitoring cannot be performed until such a number of data pieces are secured.

In particular, in the cases shown below, that is, (1) when an apparatus is newly-installed, (2) when a conventional apparatus is modified, (3) when a large scale maintenance is performed on a conventional apparatus, (4) when an environment surrounding an installed apparatus is changed, (5) when software for abnormality monitoring is modified (updated), or (6) when parameters (data items) for abnormality monitoring are changed, it is required to newly create or update the model (judgment model). Thus, there is a problem that abnormality monitoring cannot be started or abnormality monitoring has to be suspended until data pieces required for this purpose (sufficient amount of abnormal case data) are accumulated.

(Second Problem: Learning from Abnormal Cases)

Secondly, there is a problem that when the occurrence of abnormalities is rare or none (when abnormal case data is less or none), learning of judgment models and others does not make progress.

More specifically, as conventional premises, (1) it is effective in improving the monitoring accuracy to make adjustment of the judgment model based on the learning of the abnormal case after experiencing an apparatus abnormality and to make adjustment of a judgment threshold for abnormality judgment based on the learning from the matching with a deviance with reference to the judgment model. Furthermore, (2) it is effective in causal analysis to create models (diagnostic models) for diagnosing the cause of an abnormality (failure) for an abnormal state and accumulate these models in a database (DB) or the like.

However, if the occurrence of abnormalities is rare or none in the state where technologies of the above-described premises are applied, there is a problem that the learning of judgment models and judgment thresholds and the accumulation of diagnostic models do not make progress.

For the problems (first and second problems) described above, the present invention has objects (first and second objects) described below.

(First Object: Deficiency in the Number of Pieces of Data)

Firstly, an object is to achieve a model capable of accurately detecting (judging) an abnormality (abnormality sign) even when a sufficient number of data pieces cannot be secured from target apparatus in creating a model (judgment model) serving as a reference for abnormality judgment, and to achieve a monitoring judgment using the model.

(Second Object: Learning from Abnormal Cases)

Secondly, an object is to achieve learning (or its progress) of models (judgment models) capable of accurately making an abnormality judgment and to achieve accumulation (or its progress) of models (diagnostic models) capable of accurately diagnosing the cause of abnormality even when abnormal case data of the target apparatus is less or none in the learning of the judgment models and the judgment thresholds based on abnormal cases and the accumulation of the diagnostic models.

Note that, conventionally, there has been no technology of analogizing (producing) a model for a newly-installed apparatus with using a plurality of apparatuses as a target for monitoring and data collection, for example, based on data of already-installed similar apparatuses.

In summary, a main object of the present invention relates to the above-described apparatus abnormality monitoring method and CBM technology, and is to provide a technology capable of achieving (1) a model (judgment model) capable of accurate abnormality detection (judgment) and monitoring using the model, (2) furthermore, a model (diagnostic model) capable of accurate abnormality (failure) cause presumption (diagnosis) and improvement in maintenance efficiency by the diagnosis using the model, and others.

Means for Solving the Problems

The following is a brief description of an outline of the typical invention disclosed in the present application. To achieve the objects described above, a typical embodiment of the present invention relates to an apparatus abnormality monitoring method and its system, and has a feature in the structure described below.

In the present invention, in particular, a plurality of apparatuses (similar apparatuses) having a similar feature, structure and others are taken as process targets. By using models created based on apparatus state measurement data (sensor data) collected and obtained from each of the plurality of apparatuses, abnormality monitoring (judgment), abnormality cause diagnosis, and others are performed. Note that, in the specification, a model is referred to as a prediction model, a judgment model, a diagnostic model, or others as appropriate according to the difference in function, use, computation expression, or others.

In the present invention, even if a sufficient number of data pieces cannot be secured from the apparatus to be monitored or the like, the first problem described above (deficiency in the number of pieces of data) is solved by producing a model (judgment model) for abnormality judgment or the like of the target apparatus by using data of a plurality of (two or more) similar apparatuses other than the target apparatus.

For the second problem described above (learning from abnormal cases), the present invention uses a method in which judgment models and their thresholds for judgment are learned and models (diagnostic models) for abnormality cause diagnosis are accumulated based on abnormal cases (data thereof) of a plurality of similar apparatuses other than the apparatus to be monitored or the like. When this method is used, there is a following problem in the conventional technologies. More specifically, when the above-described method is used, apparatuses from which abnormal case data is to be obtained are required to satisfy the following conditions with regard to the apparatus to be monitored or the like, that is: (1) to have perfectly identical features and structure, (2) to be installed in a perfectly identical environment, and (3) to be in perfectly identical working operation conditions. Unless abnormal cases of such apparatuses are used, accuracy of abnormality judgment, diagnosis, and others cannot be improved, and the accuracy may be degraded in some cases. Such problems described above are solved in the present invention.

In the method of the present embodiment, for example, with using information processing of a computer and taking a plurality of (K+1) similar apparatuses as process targets, based on a plurality of (two or more) apparatus state measurement data items (variables) of each of the apparatuses obtained by measuring states of each of the apparatuses with a plurality of (two or more) sensors, processes for monitoring and judging an abnormality of a state of at least one of the plurality of (K+1) apparatuses are performed. Among the plurality of (K+1) apparatuses, one first apparatus is taken as a target for monitoring and judgment (judgment model creation target), and a plurality of (K: two or more) other second apparatuses similar to the first apparatus are taken as targets (data sources) for producing a first prediction model for monitoring and judging the first apparatus (and judgment model including the first prediction model). The embodiment includes: a first step of performing a process of producing a first prediction model (judgment model) dedicated to the first apparatus based on the plurality of (K) individual judgment models dedicated to each of the second apparatuses for monitoring and judgment created based on the plurality of data items at a time of normal condition in each of the plurality of (K) second apparatuses; and a second step of performing a monitoring execution process of inputting the plurality of data items from the first apparatus per predetermined unit time, monitoring and judging an abnormality of the state of the first apparatus by using the first prediction model (judgment model), and outputting detection information when an abnormality is detected.

The first step includes: a step of statistically classifying the plurality of data items of each of the plurality of (K) apparatuses into an objective variable (Y) and one or more other explanatory variables (X) in regression analysis; a step of creating a plurality of (K) regression models as individual prediction models of the plurality of (K) second apparatuses; a step of creating a similar-apparatus common meta prediction model that predicts a coefficient and an intercept of each of the plurality of (K) regression models as the individual prediction models of the plurality of (K) second apparatuses from a feature item value (or apparatus installation environment measurement value or the like) of each of the apparatuses; and a step of inputting a feature item value (or apparatus installation environment measurement value or the like) of the first apparatus to the meta prediction model and producing a coefficient and an intercept of a regression model as the first prediction model dedicated to the apparatus.

The second step includes: a step of inputting an explanatory variable (X) in the plurality of data items of the apparatus to the first prediction model dedicated to the first apparatus and calculating a predicted value of an objective variable (Y); a step of calculating a deviance between a measurement value of the objective variable (Y) and the predicted value; and a step of detecting an abnormality of the first apparatus by comparing the deviance and a threshold.

Also, the method of the present embodiment is an apparatus abnormality monitoring method in which a process of diagnosing an abnormality cause is performed based on abnormality detection (judgment) of at least one first apparatus among the plurality of (K+1) apparatuses. Among the plurality of (K+1) apparatuses, one first apparatus is taken as a target for cause diagnosis (diagnostic model creation target), and a plurality of (K: two or more) other similar second apparatuses are taken as targets for obtaining data for producing a second prediction model (diagnostic model formed to include the same) for diagnosis of the first apparatus. The embodiment includes: a first step of creating and accumulating individual diagnostic models of each of the plurality of (K) second apparatuses based on an abnormality cause diagnosis after the abnormality detection of the plurality of (K) apparatuses, and based on the plurality of individual diagnostic models, producing a diagnostic model for diagnosing the first apparatus; and a second step of inputting a plurality of data items of the first apparatus per predetermined unit time, monitoring and judging an abnormality of the state of the apparatus, and performing a cause diagnosing process when an abnormality is detected.

The first step includes: a step of creating individual diagnostic models of each of the plurality of (K) second apparatuses and accumulating the diagnostic models together with a feature item value (or an apparatus installation environment measurement value or the like) of each of the apparatuses; a step of creating a similar-apparatus common meta diagnostic model obtained by classifying the plurality of (K) accumulated individual diagnostic models based on the feature item value or others of the apparatus; and a step of inputting a feature item value or others of the first apparatus to the meta diagnostic model and producing a diagnostic model dedicated to the first apparatus.

The second step includes: a step of, when the abnormality is detected, inputting data items from the first apparatus to the diagnostic model dedicated to the first apparatus and performing matching with each of the models (patterns) constituting the diagnostic model; and a step of outputting information about a cause based on the matched models.

Effects of the Invention

The effects obtained by typical embodiments of the invention disclosed in the present application will be briefly described below. According to a typical embodiment of the present invention, the present invention relates to an apparatus abnormality monitoring method and CBM technology, and it can achieve (1) a model capable of accurate abnormality detection and monitoring using the model, (2) furthermore, improvement in maintenance efficiency by presumption of a part or the like to be an abnormality cause, and others.

BRIEF DESCRIPTIONS OF THE DRAWINGS

FIG. 5A is a diagram depicting an example of data item classification (table) of an apparatus in the first embodiment;

FIG. 5B is a diagram depicting a format of storage of FIG. 5A in the first embodiment;

FIG. 6A is a diagram depicting an example of a prediction model of a first similar apparatus in the first embodiment;

FIG. 6B is a diagram depicting an example of a prediction model of a second similar apparatus in the first embodiment;

FIG. 13A and FIG. 13B show diagrams of an example of transitions of a state data item value selected as an objective variable (Y) in the first embodiment, in which FIG. 13A depicts objective variable data measurement values of two similar apparatuses (a and b) and FIG. 13B depicts a transition of a predicted value (PdY) of a judgment model of the first apparatus (T);

Figure 14A:
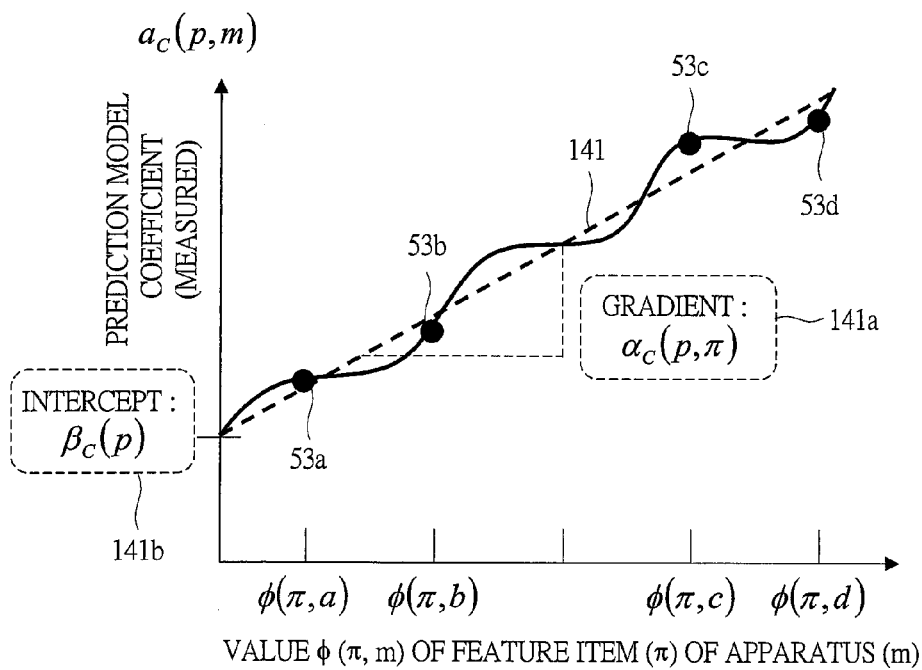
Figure 14B:
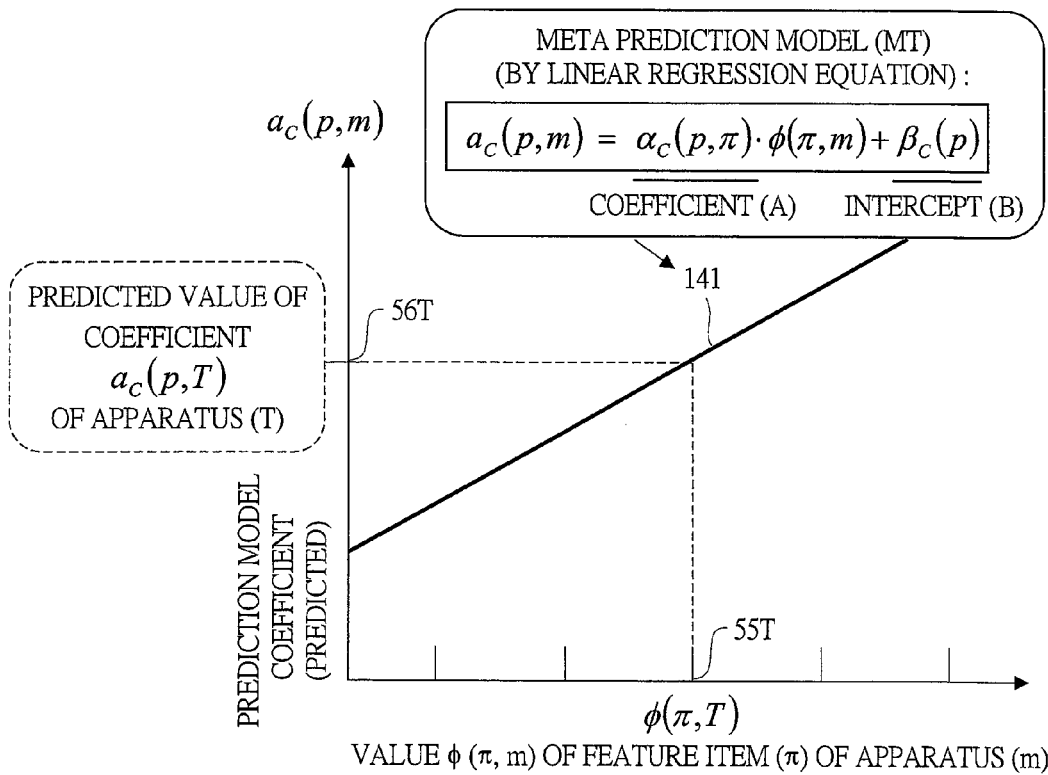
Figure 15A:
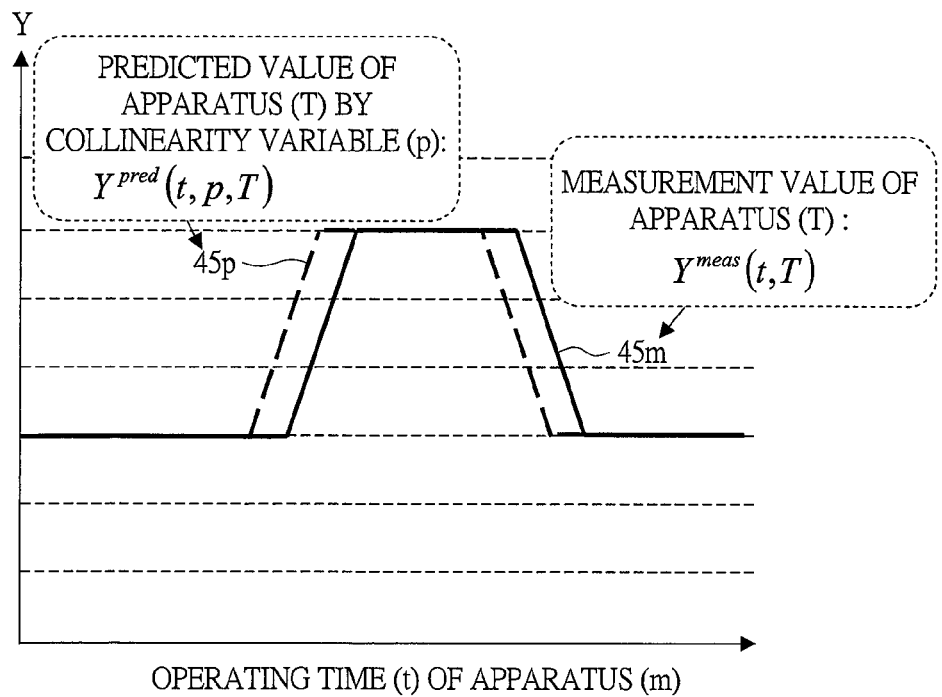
Figure 15B:
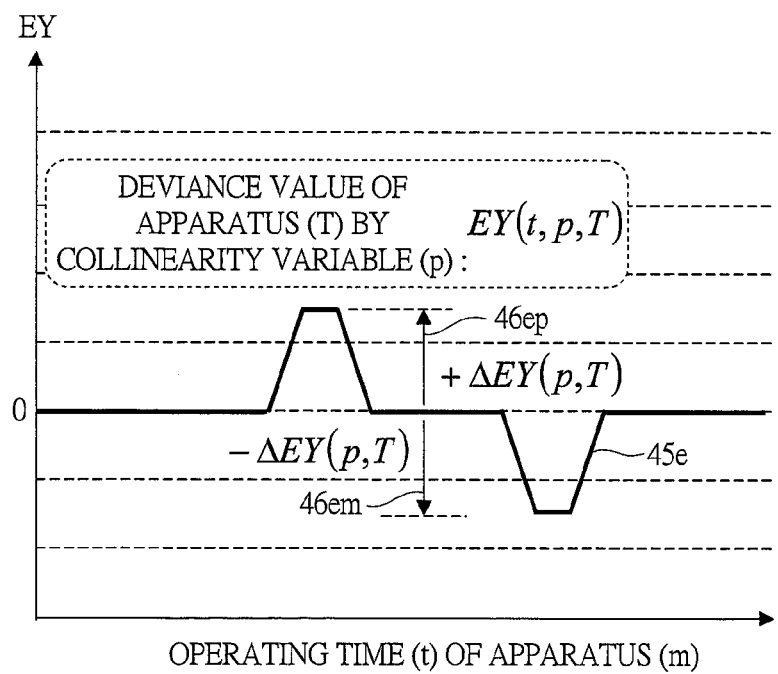
Figure 16:
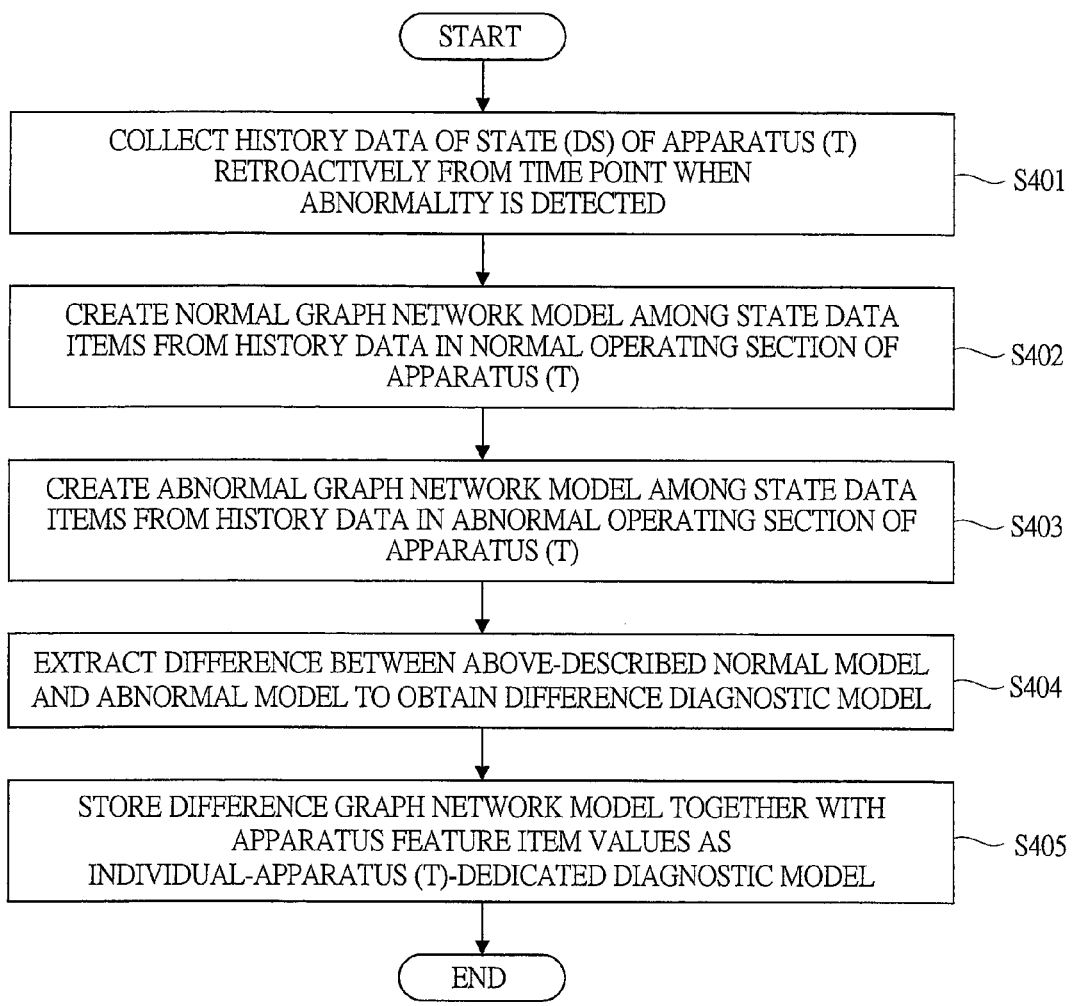
Figure 17A:
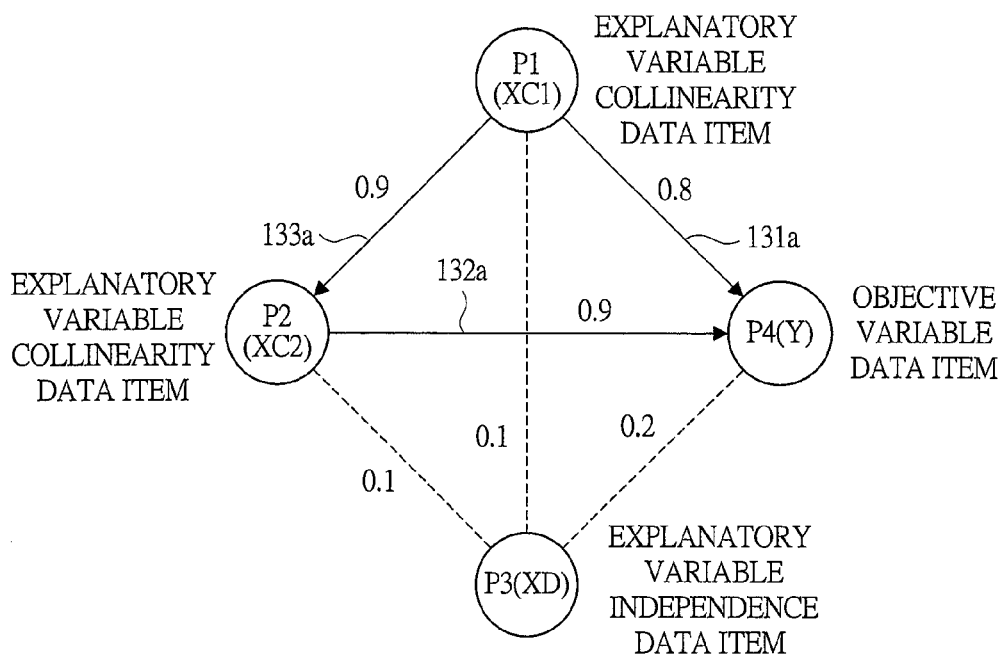
Figure 17B:
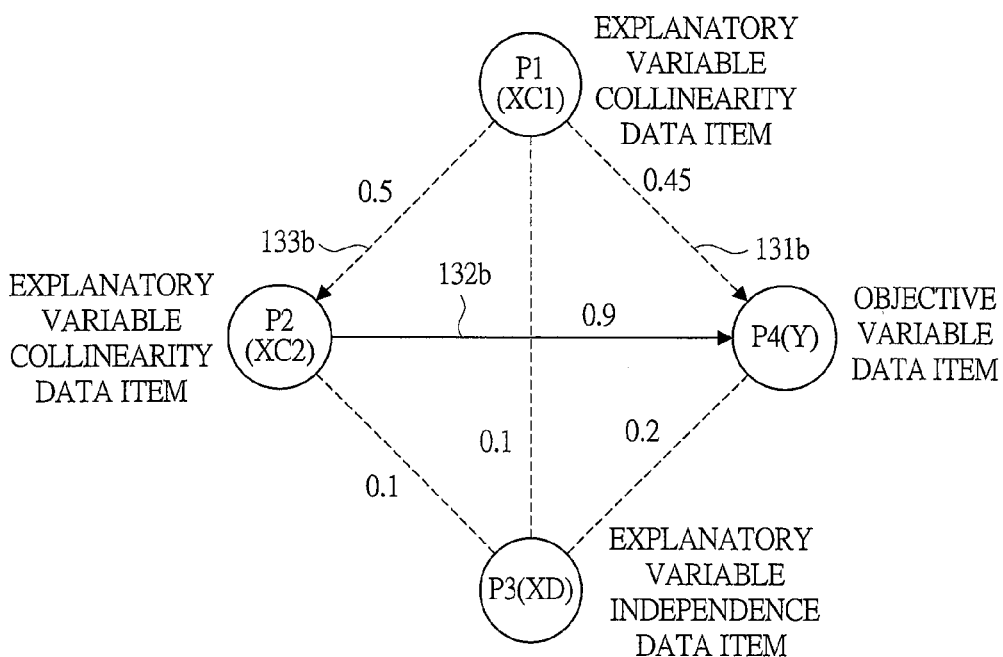
Figure 19:
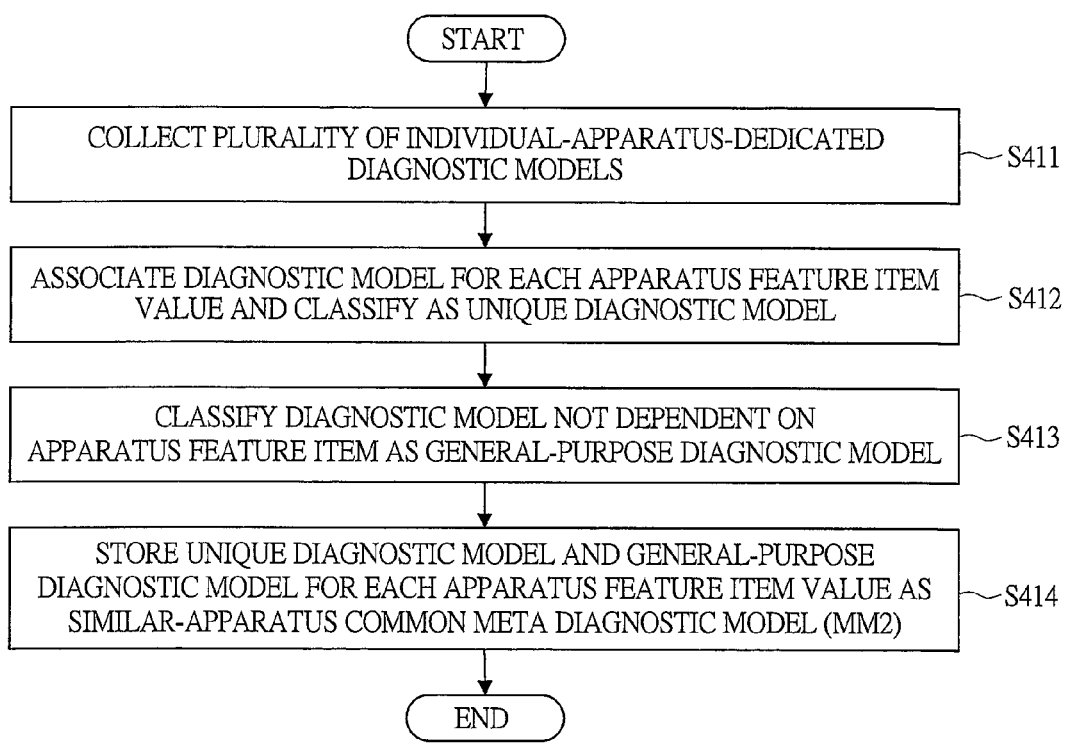
Figure 20A:
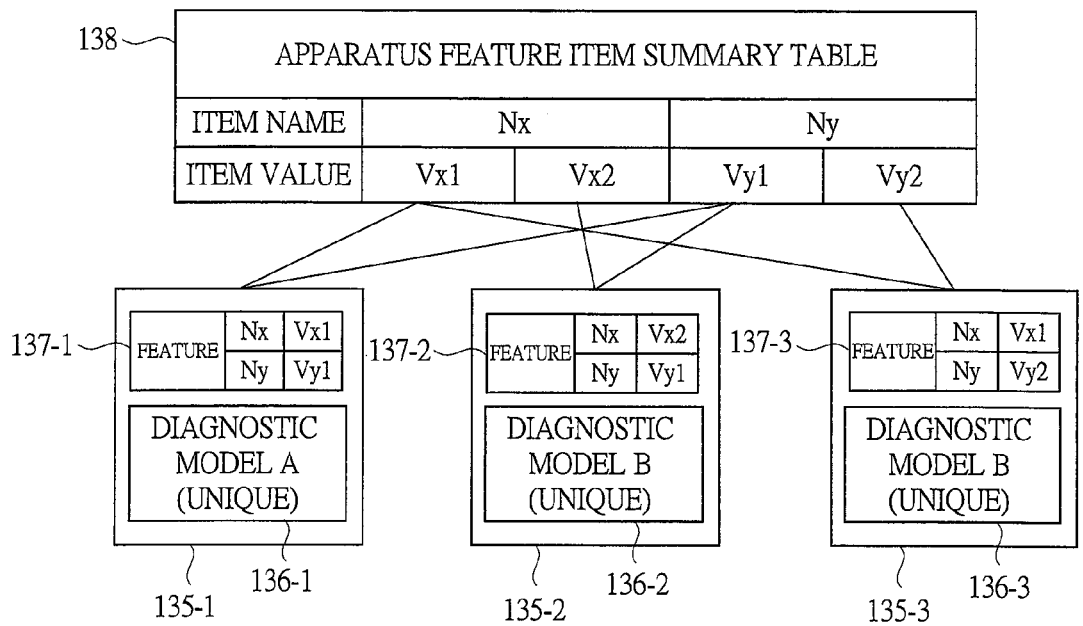
Figure 20B:
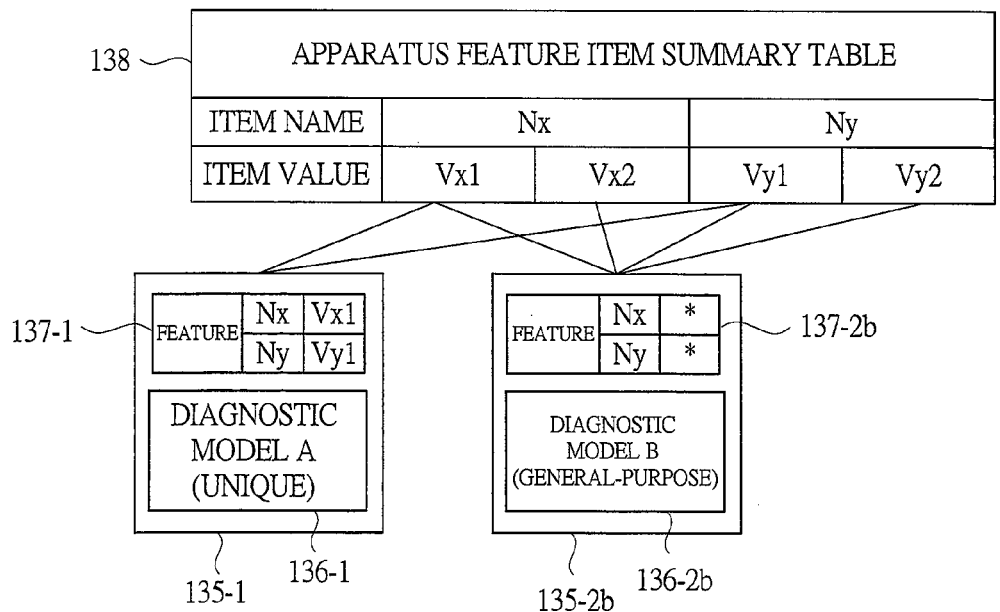
Figure 21:
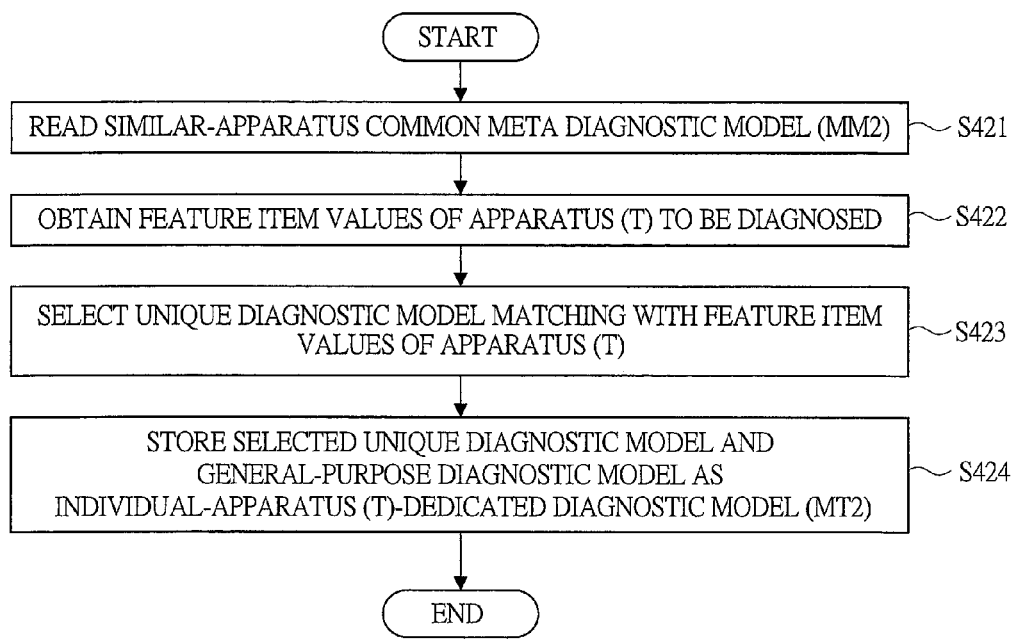
Figure 22:
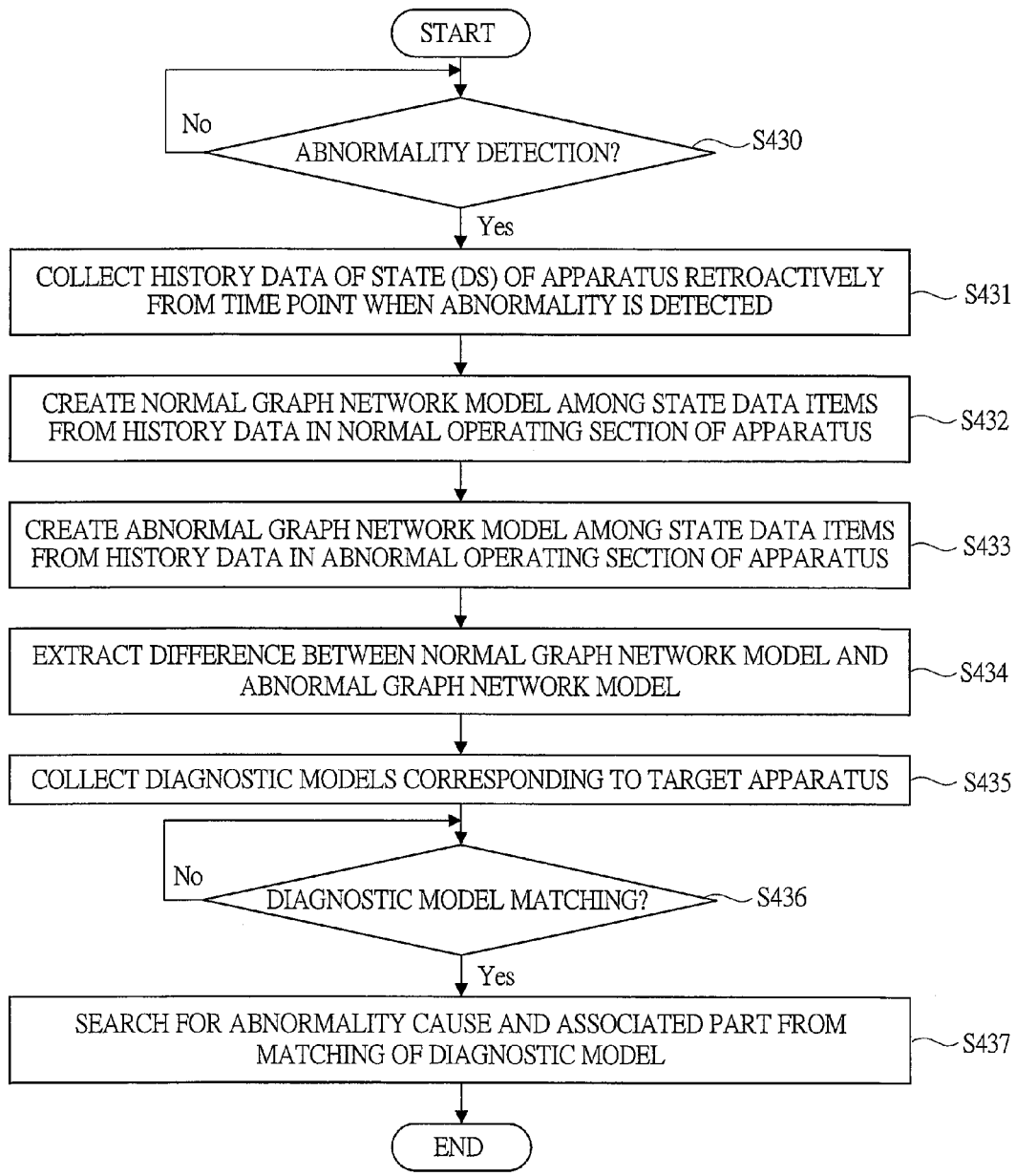

FIG. 14A and FIG. 14B show diagrams of an example of production of a meta judgment model in the first embodiment, in which FIG. 14A depicts a state of creating a meta judgment model (linear regression equation for AC) from coefficients (AC) of a plurality of individual-apparatus-dedicated judgment models and FIG. 14B depicts a state of producing a coefficient (AC) of a judgment model dedicated to the first apparatus (T) from the meta judgment model;

FIG. 15A and FIG. 15B show diagrams of an example of transitions of a state data item value selected as an objective variable of the first apparatus (T) in the first embodiment, in which FIG. 15A depicts transitions regarding a predicted value (PdY) and a measured value (Y) and FIG. 15B depicts transitions of their deviance values (EY);

FIG. 16 is a diagram depicting a process flow of an individual-apparatus-dedicated diagnostic model creation module in the second embodiment;

FIG. 17A and FIG. 17B show diagrams of a graph network causal model among state data items in the second embodiment, in which FIG. 17A depicts a graphical model in a normal state and FIG. 17B depicts a graphical model in an abnormal state;

FIG. 18 is a diagram depicting an example of element description of an individual-apparatus-dedicated diagnostic model (data thereof) in the second embodiment;

FIG. 19 is a diagram depicting a process flow of a similar-apparatus common meta diagnostic model creation module in the second embodiment;

FIG. 20A and FIG. 20B show diagrams of a method of creating a meta diagnostic model in the second embodiment, in which FIG. 20A depicts a method of managing the individual-apparatus-dedicated diagnostic model based on apparatus feature items and FIG. 20B depicts a classifying method of a unique diagnostic model and a general-purpose diagnostic model;

FIG. 21 is a diagram depicting a process flow of an individual-apparatus (T)-dedicated diagnostic model production module targeted for the first apparatus (T) in the second embodiment; and FIG. 22 is a diagram depicting a process flow of an abnormality cause diagnosis module in the second embodiment.

BEST MODE FOR CARRYING OUT THE INVENTION

Hereinafter, embodiments of the present invention will be described in detail with reference to the accompanying drawings. Note that components having the same function are denoted by the same reference symbols throughout the drawings for describing the embodiments, and the repetitive description thereof will be omitted. Note that the apparatus abnormality monitoring method and system of the embodiments include not only an apparatus abnormality monitoring method and system for abnormality judgment and abnormality cause diagnosis by monitoring an apparatus state but also an apparatus maintenance method and system for making an instruction for maintenance or the like of the apparatus based on the judgment and diagnosis results. Also, each operating main body is mainly information processing (program, processor, or the like) of a computer unless otherwise specified.

<General Outlines>

Figure 1:
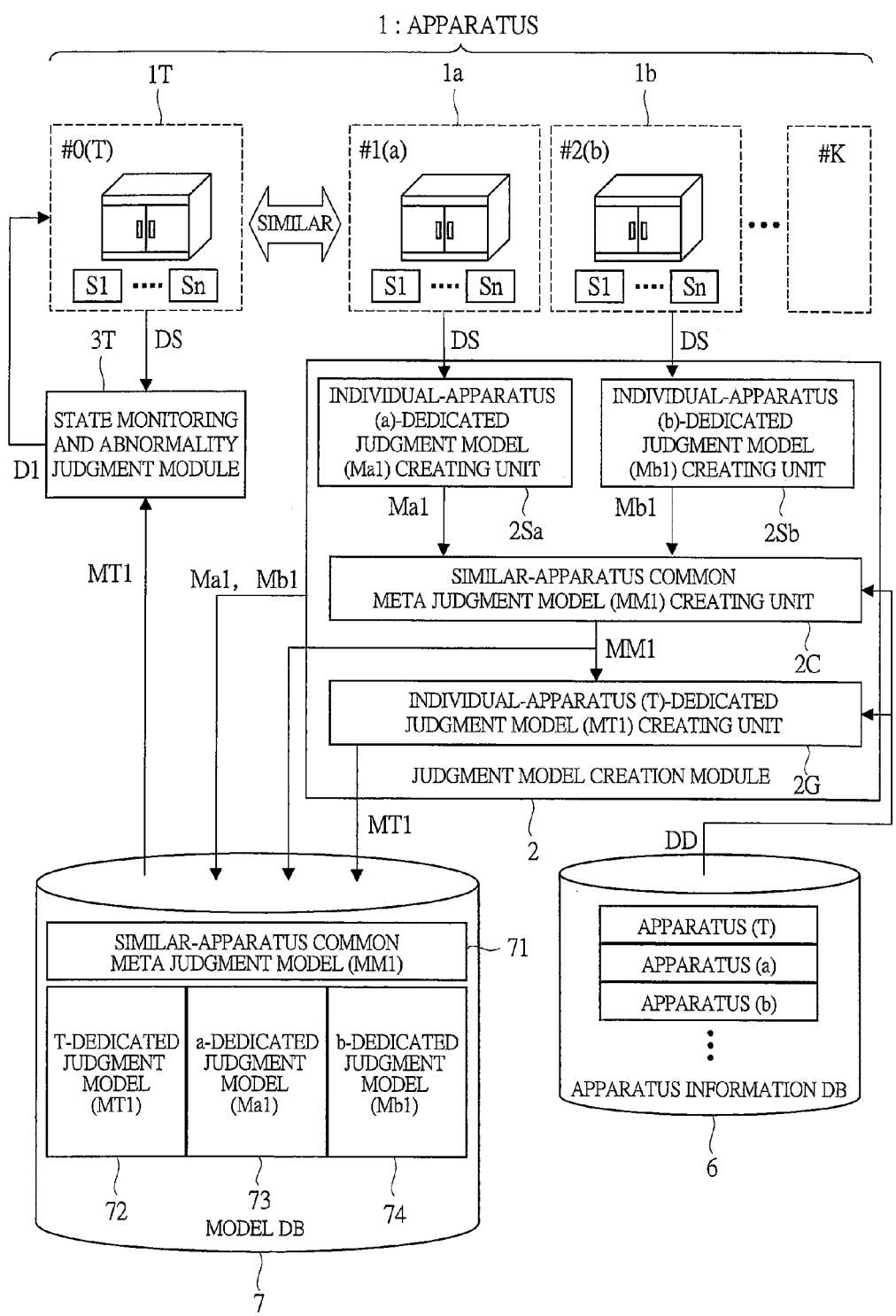
FIG. 1 is a diagram depicting an example of structure of main portions for a state abnormality monitoring and judging process in a system (apparatus abnormality monitoring system) and a method (apparatus abnormality monitoring method) of a first embodiment of the present invention.

First, general outlines of the embodiments are as follows (reference characters correspond to those in the drawings described further below). As depicted in FIG. 1 and others, the present system relates to monitoring (abnormality judgment) of a newly-installed apparatus (T) among a plurality of (K+1) apparatuses 1, and in a judgment model creation module 2, an individual judgment model is created for each of a plurality of (K) already-installed similar apparatuses (such as a and b). More specifically, for each individual apparatus, based on a plurality of pieces of state data (DS), a prediction model of an objective variable (Y) from an explanatory variable (X) based on regression analysis is created. Next, a meta prediction model that predicts a coefficient and an intercept of each of these individual prediction models from a feature item value or others of each of the apparatuses 1 is created. Then, from this meta prediction model, a prediction model dedicated to the target apparatus (T) (judgment model including the prediction model) is produced. By using this judgment model, a judgment module 3T monitors the state of the apparatus (T) and performs abnormality detection (outputs detection information).

Figure 2:
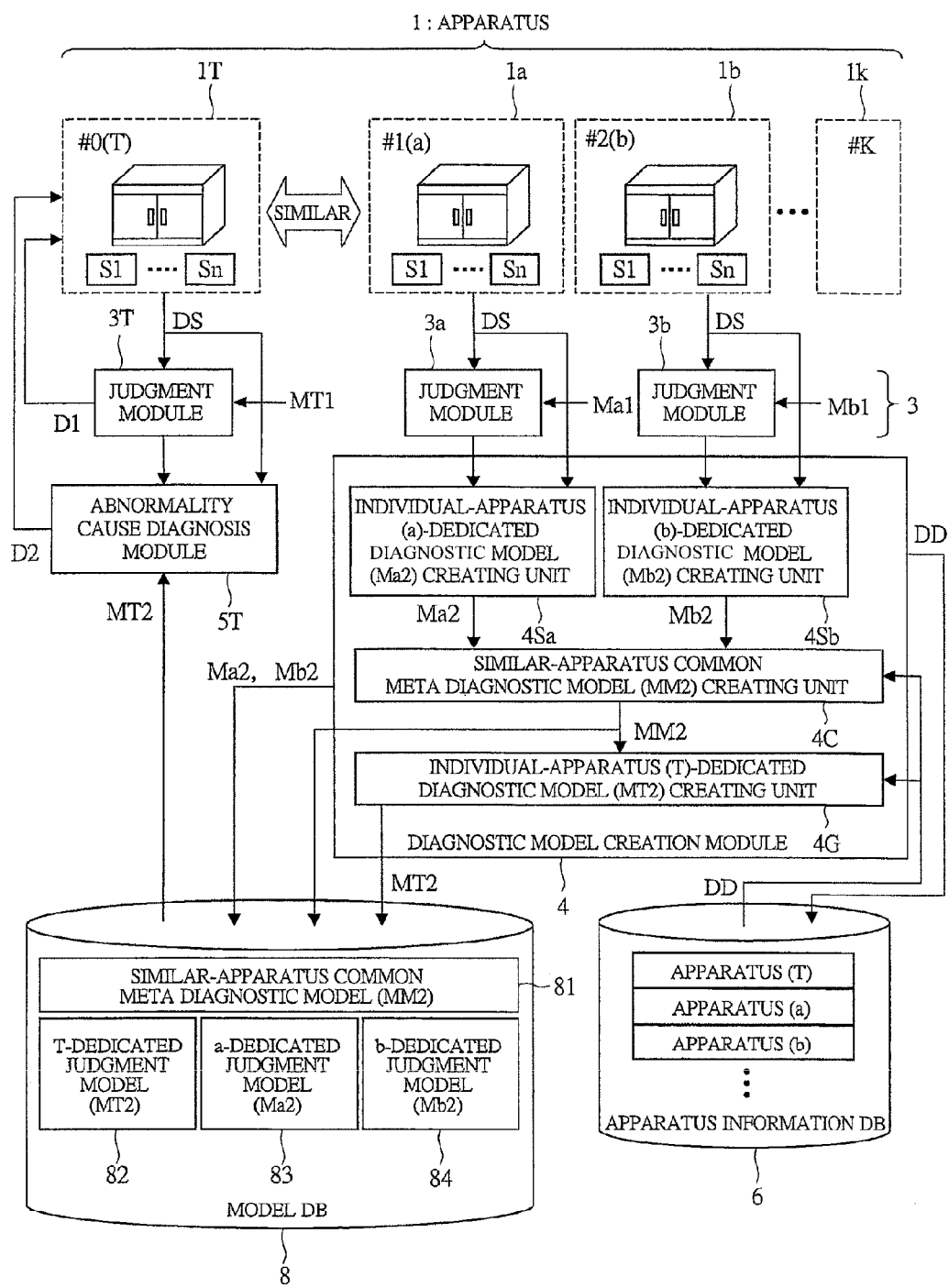
FIG. 2 is a diagram depicting an example of structure of main portions for a state abnormality monitoring and judging process and an abnormality (failure) cause diagnosing process in a system (apparatus abnormality monitoring system) and a method (apparatus abnormality monitoring method) of a second embodiment of the present invention.

Also, as depicted in FIG. 2 and others, in the present system, based on the abnormality detection of the apparatus (T) described above, when a diagnosis of the abnormality is further performed, in a diagnostic model creation module 4, for an abnormal case (data thereof) of each of the plurality of similar apparatuses (such as a and b), an individual diagnostic model is created for each of the apparatuses. These diagnostic models are selected (classified) from the feature item value or others of each of the apparatuses 1 to create a diagnostic model dedicated to the target apparatus (T). By using this diagnostic model, a diagnosis module 5T performs a diagnosis of a cause of the abnormality (failure) of the target apparatus (T) based on the abnormality detection described above (outputs information about a presumed cause and others).

FIRST EMBODIMENT

An apparatus abnormality monitoring method and its system of a first embodiment of the present invention will be described with reference to FIG. 1, FIG. 3 to FIG. 15, and others. In the first embodiment, an abnormality judging function is provided. For an apparatus (T) as a target for monitoring and judgment, individual judgment models (such as Ma1 and Mb1) of a plurality of similar apparatuses (such as a and b) and a meta judgment model (MM1) based on these judgment models are created. Based on these, a judgment model (MT1) dedicated to the target apparatus (T) is produced, and a process of making a judgment (state monitoring and abnormality judgment) is performed by using this. A judgment model across a similar apparatus group is created, and model and data of the target apparatus (T) is analogized and learnt based on model and data of the other similar apparatuses (such as a and b). Note that a model for making an abnormality judgment (including prediction model and others) is referred to as a judgment model.

<System (1)>

Figure 3:
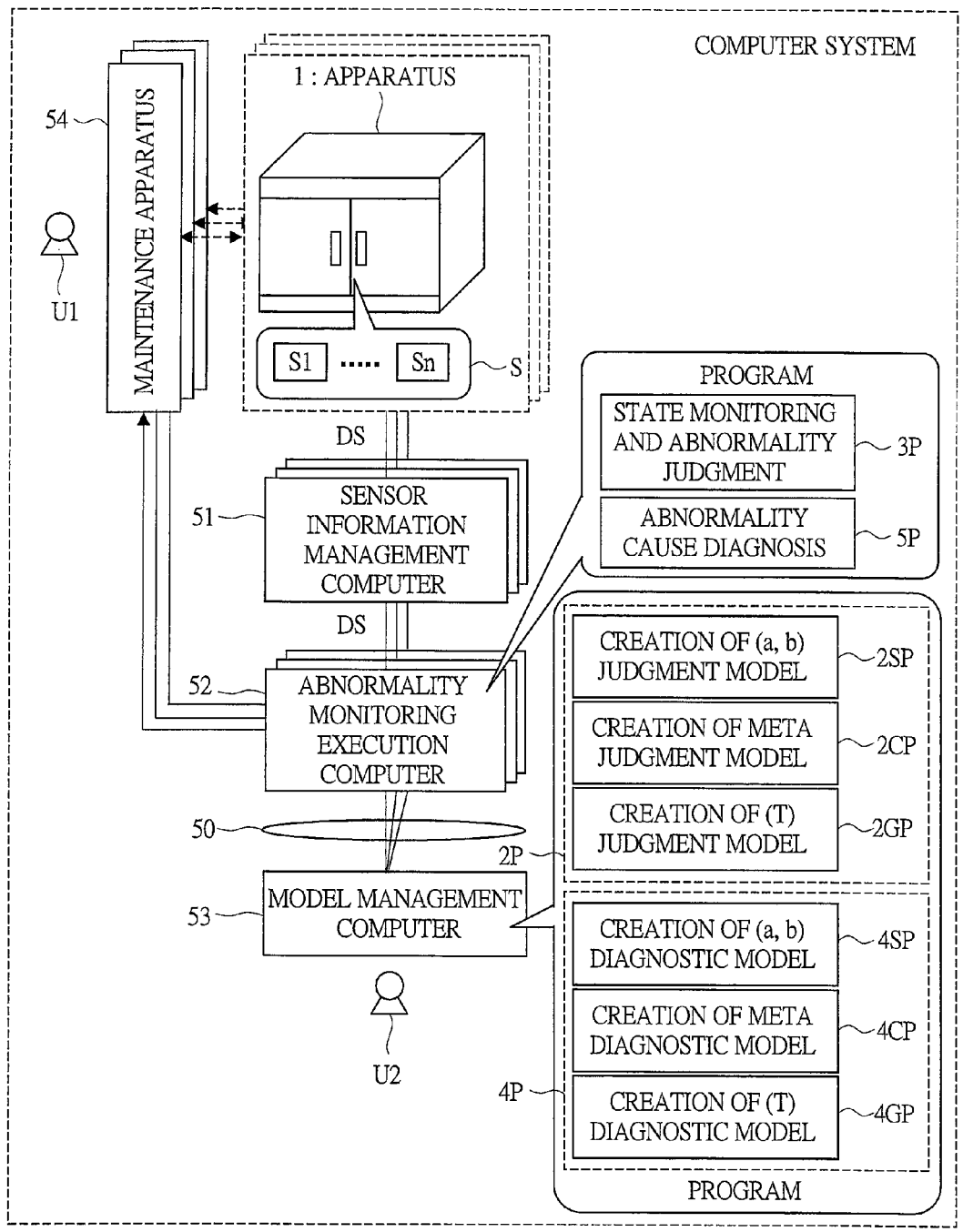
FIG. 3 is a diagram depicting an example of structure of a computer system having the systems of the first and second embodiments incorporated therein.

FIG. 1 depicts a system (apparatus abnormality monitoring system) achieving the apparatus abnormality monitoring method of the first embodiment. Note that each module and sub-module (processing unit) in each drawing is achieved by information processing of a general computer using predetermined hardware and software. An example of the structure as the computer system is depicted in FIG. 3 (described further below).

This system has a plurality of (K+1: three or more) apparatuses (similar apparatuses) 1 as process targets. For example, in FIG. 1, a first (#0) apparatus (T)1T, a second (#1) apparatus (a)1a, a third (#2) apparatus (b)1b, and others are provided (# represents an identification number). Although not shown, there are also fourth and subsequent apparatuses (#3(c), #4(d), . . . , #K).

The apparatus (T)1T is a newly-installed apparatus to be selected as a target for monitoring or the like (that is, judgment model production target). For the newly-installed apparatus (T)1T, the amount and number of pieces of data of abnormality cases (data for model creation) are less. Meanwhile, the plurality of (K: two or more) apparatuses 1 (#1(a), #2(b), . . . #K) such as the apparatuses (a)1a and (b)1b are apparatuses (similar apparatuses) having similar feature and structure to those of the apparatus (T)1T. More specifically, the whole plurality of (K+1) apparatuses 1 form a similar apparatus group. The plurality of (K) similar apparatuses 1 other than the apparatus (T)1T are already-installed apparatuses to be the targets for creating a model that can be shared in common among the plurality of (K+1) apparatuses 1, and a number and amount of data enough to create the model has been accumulated. At least two or more apparatuses 1 are selected as targets (data sources) for creating a judgment model of the target apparatus (T)1T. In this example, for the purpose of simplification, the case in which two apparatuses (a and b) are used as targets thereof will be described.

Each of the apparatuses 1 (such as T, a, and b) is an apparatus (facility, system, or the like) such as an energy conversion apparatus (combined heat and power apparatus, electrical apparatus, power apparatus, heat source apparatus, or the like). Note that one apparatus 1 may be a system or the like made up of a plurality of apparatuses, modules, and others. The plurality of apparatuses 1 are not necessarily apparatuses duplicated (manufactured) from the same design drawing, and can be similar apparatuses having similar features and structures among them. Also, as a similar apparatus, a same-type apparatus may be included. Even in the same-type apparatuses, apparatus states (measured data item values) are different if their installing environments (for example, temperatures around the apparatuses) and others are different.

For each of the apparatuses 1, a plurality of (n: two or more) sensors S (S: S1, . . . , Sn) that measure the state of a predetermined portion or type are incorporated or externally provided near each apparatus 1. Each of the plurality of sensors S outputs corresponding sensor data (apparatus state measurement data) DS.

The present system has a judgment model creation module 2, a state monitoring and abnormality judgment module (judgment module) 3T, and others for the apparatuses 1. Each of the modules (2 and 3T) uses an apparatus information DB 6, a model DB 7, and others as a storage module (DB) for storing data.

In the apparatus information DB 6, apparatus feature and structure data (DD) and others regarding the apparatuses 1 are stored. The apparatus feature and structure data (DD) is the data including basic structure information of each apparatus 1, feature variable item values and apparatus installation environment measurement values for specifying a difference in feature, structure, or others in the plurality of similar apparatuses 1, and others.

In the model DB 7, data (71 to 74) regarding judgment models of the apparatuses 1 are stored. Specifically, the data 71 of a similar-apparatus common meta judgment model (MM1), the data 72 of an individual-apparatus (T)-dedicated judgment model (MT1), the data 73 of an individual-apparatus (a)-dedicated judgment model (Ma1), and the data 74 of an individual-apparatus (b)-dedicated judgment model (Mb1) are stored.

The judgment model creation module 2 creates and updates a judgment model (MT1) for abnormality judgment by state monitoring regarding the target apparatus (T) by using the sensor data DS from each of the plurality of (two) apparatuses (a and b) as data sources, the data (DD) in the apparatus information DB 6, the data of the models in the model DB 7, and others.

The judgment model creation module 2 includes, as sub-modules (processing units), a plurality of (two) individual-apparatus (a and b)-dedicated judgment model (Ma1 and Mb1) creating units 2Sa and 2Sb, a similar-apparatus common meta judgment model (MM1) creating unit 2C, and an individual-apparatus (T)-dedicated judgment model (MT1) producing unit 2G.

The Ma1 and Mb1 creating units 2Sa and 2Sb are processing units that create judgment models (Ma1 and Mb1) dedicated to the individual apparatuses (a) and (b) based on the plurality of pieces of sensor data DS and apparatus information from the corresponding apparatuses 1 (a and b). The MM1 creating unit 2C is a processing unit that creates a meta judgment model (MM1) that is common among the similar apparatuses 1 based on the models (Ma1 and Mb1) created by 2Sa and 2Sb and the apparatus feature and structure data (DD). The MT1 producing unit 2G is a processing unit that produces a judgment model (MT1) dedicated to the target apparatus (T) based on the meta judgment model (MM1) created by 2C and the apparatus feature and structure data (DD) of the target apparatus (T).

The judgment module 3T performs a process of state monitoring (abnormality judgment) of the target apparatus (T) by using the sensor data DS from the target apparatus (T)1T and data of the judgment model (MT1) by the judgment model creation module 2 (model DB 7), and as a result, when an abnormality (abnormality sign) of the apparatus (T) is detected, it outputs apparatus stop instruction information D1 and others as detection information to the apparatus (T)1T and others, thereby stopping the operation of the apparatus 1.

In the present embodiment, a symmetrical structure in which the same functions (modules) are connected to each of the plurality of apparatuses 1 is assumed. While the judgment module 3T is connected to the apparatus (T) as the monitoring target and the judgment model creation module 2 is connected to the similar apparatuses (a and b) as data sources in FIG. 1 as minimum elements, the structure in which similar modules (those corresponding to 2 and those corresponding to 3T) are connected to each apparatus 1 is assumed. By this means, any of the apparatuses 1 can be selected as a monitoring target or a data source. As a matter of course, if the monitoring target is fixed, the structure may be formed of only the minimum elements as depicted in FIG. 1.

<System (2)>

FIG. 2 depicts a system structure of a second embodiment in the same manner as that of FIG. 1. In the second embodiment, a cause diagnosing function is provided in addition to the abnormality judgment function. The system structure of the second embodiment in FIG. 2 will be first described, and details of the second embodiment will be described after details of the first embodiment.

A system of FIG. 2 has a structure in which a diagnostic model creation module 4, an abnormality cause diagnosis module (diagnosis module) 5T, and others are further provided for the apparatuses 1 (such as T, a, and b) and the judgment module 3 (such as 3T, 3a, or 3b) connected to each of the apparatuses 1 similar to those of FIG. 1. Note that, as with FIG. 1, each judgment module 3 performs a judging process by using a judgment model (such as MT1, Ma1, or Mb1) created by the judgment model creation module 2 (not shown in the drawing).

The diagnostic model creation module 4 is connected to a plurality of (for example, two) similar apparatuses (a)1a,(b)1b, and others as data sources and the respective judgment modules 3a, 3b,and others associated therewith. The diagnosis module 5T is connected to one apparatus (T)1T as a target for monitoring, diagnosis, and others and the judgment module 3T associated therewith. Also, each of the modules (such as 4 and 5T) uses an apparatus information DB 6, a model DB 8, and others as storage modules (DB).

The diagnostic model creation module 4 creates and updates a model (diagnostic model) for diagnosis (abnormality cause diagnosis) regarding the target apparatus (T)1T by using sensor data DS from the plurality of apparatuses 1 (such as a and b) as process targets (data sources) (and judgment result information from the judgment modules (3a and 3b) and others) and apparatus feature and structure data DD from the apparatus information DB 6.

The diagnostic model creation module 4 includes, as sub-modules (processing units), individual-apparatus (a and b)-dedicated diagnostic model (Ma2 and Mb2) creating units 4Sa and 4Sb, a similar-apparatus common meta diagnostic model (MM2) creating unit 4C, and an individual-apparatus (T)-dedicated diagnostic model (MT2) producing unit 4G.

The Ma2 and Mb2 creating units 4Sa and 4Sb are processing units that create diagnostic models (Ma2 and Mb2) dedicated to the individual apparatuses 1 (a and b) based on the data (DS) from the corresponding apparatuses 1 (a and b) and the data from the judgment modules 3a and 3b, respectively. The MM2 creating unit 4C is a processing unit that creates a meta diagnostic model (MM2) that is common among a plurality of (K+I) similar apparatuses 1 based on the diagnostic models (Ma2 and Mb2) created by 4Sa and 4Sb and the apparatus feature and structure data (DD). The MT2 producing unit 4G is a processing unit that produces a diagnostic model (MT2) dedicated to the target individual apparatus (T) 1T based on the meta diagnostic model (MM2) created by the 4C and the apparatus feature and structure data (DD) of the target apparatus (T).

The diagnosis module 5T performs a process of diagnosing an abnormality cause of the diagnosis target apparatus (T) by using the sensor data DS from the diagnosis target apparatus (T)1T, data from the judgment module 3T, and data of the diagnostic model (MT2) by the diagnostic model creation module 4. As a result, an apparatus maintenance position instruction information (maintenance instruction information) D2 and others are outputted to the apparatus (T) or its maintenance apparatus (54 in FIG. 3). By this means, efficiency of the maintenance operation can be improved, and the maintenance time (repair time) of the apparatus (T) can be reduced.

<Computer System>

FIG. 3 depicts an example of structure of a computer system having the system of FIG. 1 or FIG. 2 incorporated therein. Elements such as modules in FIG. 1 and FIG. 2 are mainly achieved in the form of programs operating on computers in this computer system. A correspondence between each module (corresponding program) and each computer is as depicted in FIG. 3. Each computer includes a processor, a memory, a communication interface, an input/output device, and others though not shown in the drawing. A connection between the computers is made via, for example, a dedicated line or a communication network.

In this computer system, sensor information management computers 51, abnormality monitoring execution computers 52, a model management computer 53, and maintenance apparatuses (maintenance operation terminals) 54 are provided for the apparatuses 1 (for example, T, a, and b). The maintenance apparatus 54 is installed so as to correspond to each apparatus 1. Further, in the present example, one sensor information management computer and one abnormality monitoring execution computer 52 are connected to each of the apparatuses 1 in a one-to-one manner, and one model management computer 53 is installed so as to correspond to the plurality of abnormality monitoring execution computers 52 (and maintenance apparatuses 54). Each apparatus 1 may be installed at a remote location. For example, each of the apparatuses (the plurality of abnormality monitoring execution computers 52 and others) is connected to one model management computer 53 via a communication network 50.

The sensor information management computers 51 are connected to a plurality of (n) sensors S (S1 to Sn) of each of the apparatuses 1 and have an apparatus state measurement interface function for sampling and collecting the state measurement data (sensor data) DS of the apparatus 1 through the plurality of sensors S.

The abnormality monitoring execution computers 52 are connected to the sensor information management computers 51, the maintenance apparatuses 54, and the model management computer 53, and when the processor executes programs and data on the memory, the judgment module 3 (3T), the diagnosis module 5 (5T), and others described above are achieved by the process of the corresponding programs 3P and 5P. The abnormality monitoring execution computers 52 are individually prepared and connected to each of the plurality of apparatuses 1 (such as T, a, and b). Alternatively, a program inside one abnormality monitoring execution computer 52 may be individually executed for each of the apparatuses 1. p The model management computer 53 manages models regarding abnormality judgment, diagnosis, and others of the plurality of apparatuses 1. The model management computer 53 is connected to the abnormality monitoring computers 52 and achieves the judgment model creation module 2 (sub-modules: 2Sa, 2Sb, and others, 2C, and 2G), the diagnostic model creation module 4 (sub-modules: 4Sa, 4Sb, and others, 4C, and 4G), and others described above by the process of the corresponding programs 2P (2SP, 2CP, and 2GP), 4P (4SP, 4CP, and 4GP) and others.

In another example of structure, the diagnosis module (corresponding program 5P) can be provided on a side of a computer other than the abnormality monitoring execution computer 52 or a side of the model management computer.

The maintenance apparatus 54 is, for example, a terminal used by a maintenance operator (U1). The maintenance apparatus 54 is connected to the abnormality monitoring computer 52 and achieves the functions of a maintenance operation instruction, maintenance history recording, and others by the corresponding program processing. The program for the maintenance operation instruction performs a process of, for example, displaying apparatus maintenance position instruction information D2 from the abnormality monitoring computer 52 on a display screen of the maintenance apparatus 54. The program for maintenance history recording performs a process of, for example, recording maintenance history including an input process of an abnormality cause by the maintenance operator (U1) and others. Note that the maintenance apparatus 54 may be, for example, an apparatus independent of the apparatus 1 or may be an apparatus (function) incorporated in or connected to the apparatus 1.

On the computers of the present system, a system administrator (U2) manages the present system and manipulates settings of the system. For example, the system administrator (U2) makes settings of a mode to be used, an objective variable and others. Necessary numerical values and information such as each threshold are set in advance to the present system or are set as appropriate by the system administrator (U2) or others.

Note that the storage modules (such as 6, 7, and 8) may be placed at any position in the system. For example, the model DB 7 and the apparatus information DB 6 are provided in the model management computer 53 having a function of the judgment model creation module 2.

<Judgment Model Creation Module>

Figure 4:
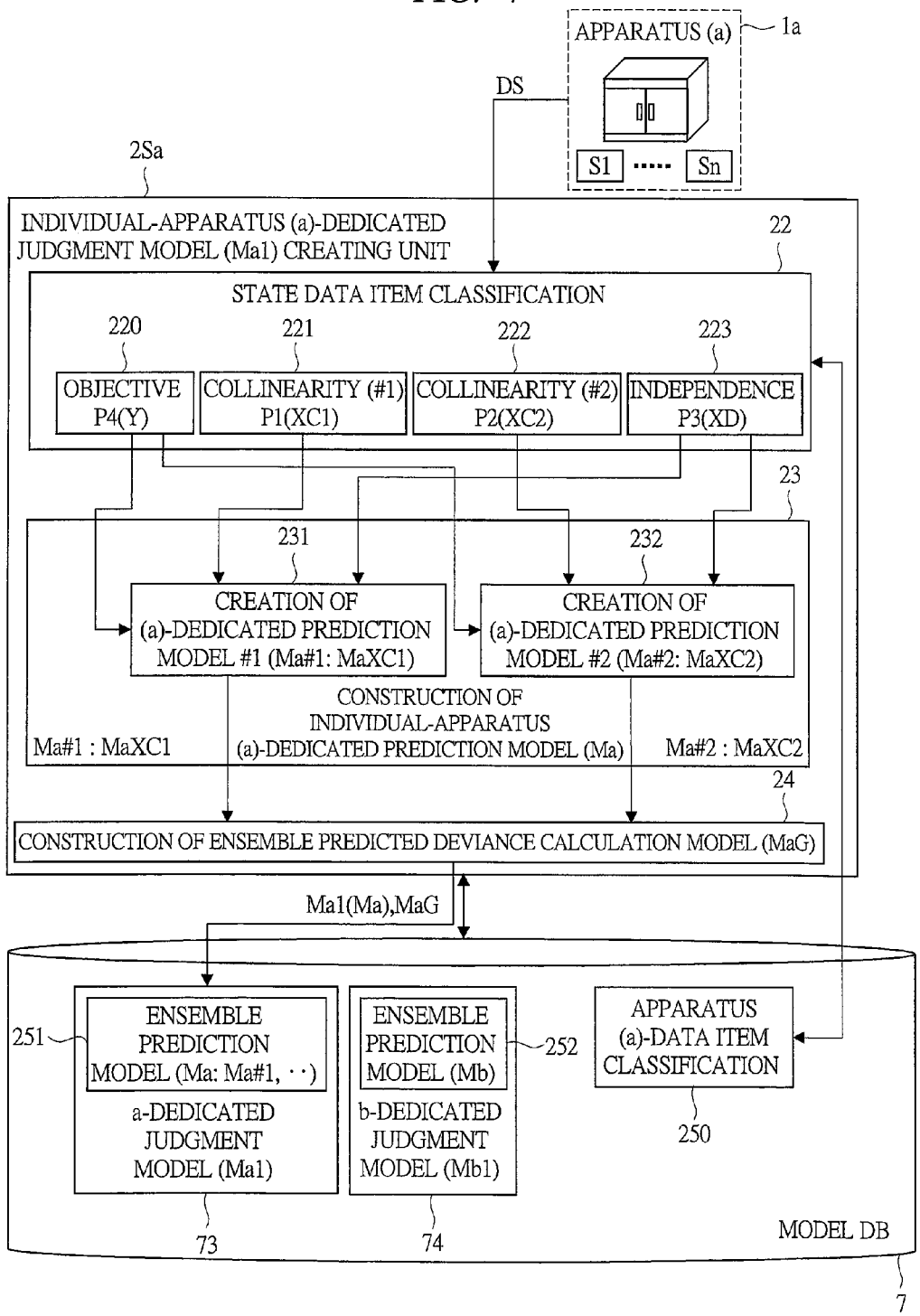
FIG. 4 is a diagram depicting a detailed structure regarding an individual-apparatus-dedicated judgment model creation sub-module of a judgment model creation module targeted for, for example, a second apparatus (a) in the first embodiment.
Figure 8:
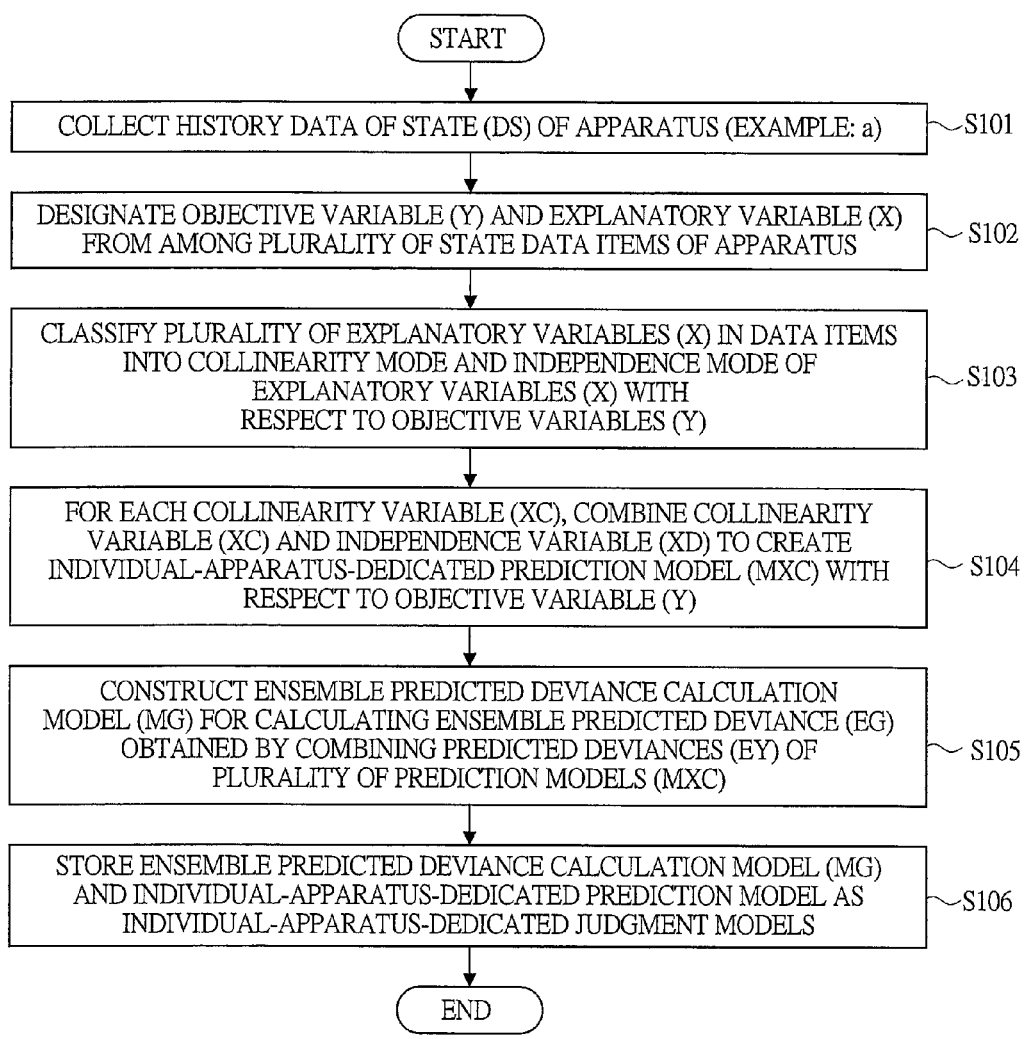
FIG. 8 is a diagram depicting a process flow of an individual-apparatus (a)-dedicated judgment model creation module in the first embodiment.

Next, FIG. 4 depicts a detailed structure of the individual-apparatus-dedicated judgment model (Ma1 and Mb1) creating units 2Sa and 2Sb (by way of example, the case of 2Sa) of the judgment model creation module 2 of the first embodiment. Its corresponding process flow is depicted in FIG. 8. The Ma1 creating unit 2Sa includes, as processing units, a data item classifying unit 22, an individual-apparatus (a)-dedicated prediction model (Ma) constructing unit 23, an (individual-apparatus (a)-corresponding) ensemble predicted deviance calculation model (MG: MaG) constructing unit 24, and others, and uses the apparatus information DB 6, the model DB 7, and others.

The Ma1 creating unit 2Sa receives an input of the state measurement data DS from the plurality of sensors of the individual apparatus (a)1a to be processed and stores the data in the storage module or the like as history.

The data item classifying unit 22 statistically classifies the data items (parameters) of the state measurement data DS into an objective variable (Y), a collinearity explanatory variable (XC), and an independence explanatory variable (XD). This classification is performed by, for example, checking a correlation of respective explanatory variables (X) with respect to objective variables (Y). In this example, four data items depicted in FIG. 4 such as P4 (Y) 220, P1 (XC1) 221, P2 (XC2) 222, and P3 (XD) 223 are provided, and these show an example of classification in the case where the correlation depicted in FIG. 5A is obtained.

FIG. 5A depicts the example in which the four data items P1 to P4 based on the state measurement data DS are classified into P1: an objective variable (Y) 220, a first (#1) collinearity explanatory variable (XC1) 221, a second (#2) collinearity explanatory variable (XC2) 222, and one independence explanatory variable (XD) 223. P1 (XC1) 221 has a correlation of 0.8 with P4 (Y) 220. P2 (XC2) 222 has a correlation of 0.9 with P4 (Y) 220. P3 (XD) 223 has a correlation of 0.2 with P4 (Y) 220.

Classification of these data items is stored in a format (table) depicted in FIG. 5B as data item classification (data) 250 in the storage module (model DB 7 or the apparatus information DB 6) or the like.

Based on the data item classification 250, as for the individual apparatus (a)1a, a plurality of (two in this example) prediction models (Ma: Ma#1 (MaXC1) and Ma#2 (MaXC2)) created for each collinearity explanatory variable (XC) are constructed in the Ma constructing unit 23. As the prediction model (Ma), in this example, first prediction model (Ma#1 (MaXC1)) and second prediction model (Ma#2 (MaXC2)) are provided so as to correspond to two collinearity explanatory variables XC (XC1 and XC2). Ma#1 (MaXC1) is constructed by using the objective variable (Y) 220, the first collinearity explanatory variable (XC1) 221 and the independence explanatory variable (XD) 223. Ma#2 (MaXC2) is constructed by using the objective variable (Y) 220, the second collinearity explanatory variable (XC2) 222 and the independence explanatory variable (XD) 223. Data of these prediction models (Ma: Ma#1 (MaXC1) and Ma#2 (MaXC2)) dedicated to the individual apparatus (a)1a is stored in the storage module (model DB 7) or the like.

Note that the objective variable (Y) 220 to be predicted is determined by designation (setting) by the system administrator (U2) or others, by automatic calculation by a computer, or others. An example of the setting of the objective variable (Y) is power ([W]) as an output from the apparatus 1.

The MaG constructing unit 24 constructs an ensemble prediction model 251 (including an ensemble predicted deviance calculation model MaG) made up of the plurality of (two) constructed prediction models (Ma: MaXC1 and MaXC2) described above. Then, the constructed model is stored in a format (table) depicted in FIG. 6A in the model DB 7 as data 73 of the individual-apparatus (a)-dedicated judgment model (Ma1) including the ensemble prediction model 251. MaG is described further below.

In a manner similar to that described above, as for the other individual apparatus (b)1b, an ensemble prediction model 252 (including an ensemble predicted deviance calculation model MbG) made up of a plurality of (two) prediction models (Mb: Mb#1 (MbXC1) and MB#2 (MbXC2)) is constructed by the Mb1 creation module 2Sb, and is stored in a format depicted in FIG. 6B in the model DB 7 as data 74 of the individual-apparatus (b)-dedicated judgment model (Mb1) including the ensemble prediction model 252.

Figures 9, 10:
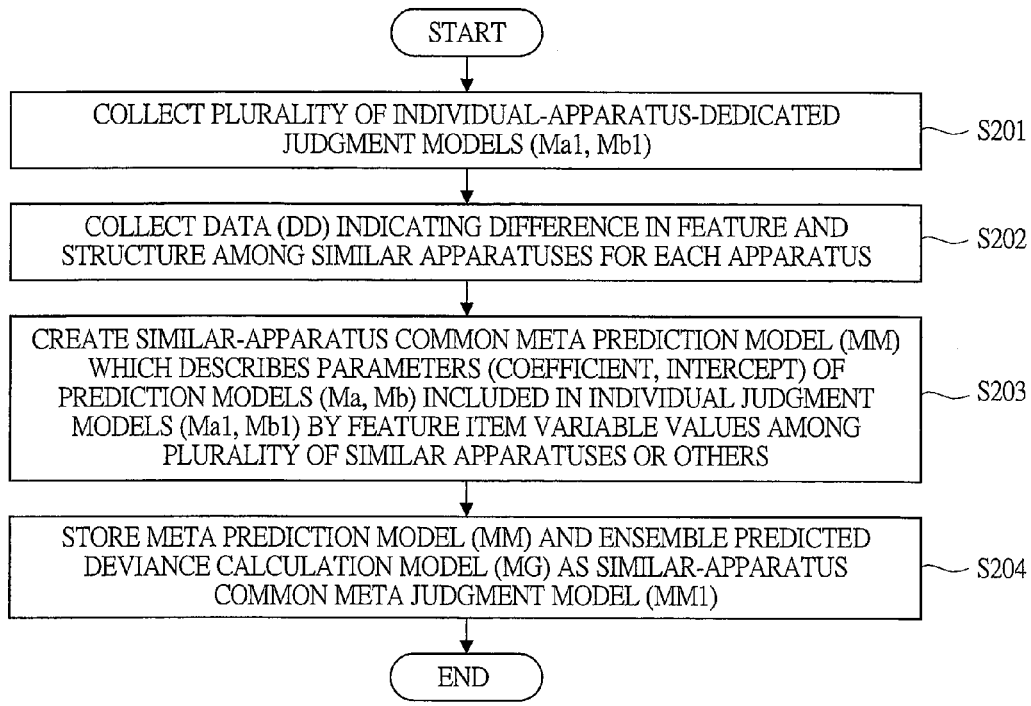
FIG. 9 is a diagram depicting a process flow of a similar-apparatus common meta judgment model creation module in the first embodiment.
FIG. 10 is a diagram depicting an example of apparatus feature and structure data in the first embodiment.

The data (73 and 74) of the judgment models (Ma1 and Mb1) including the prediction models (Ma and Mb) of the respective apparatuses (a and b) described above are used to create a meta judgment model (MM1) in the meta judgment model (MM1) creating unit 2C. A process flow of the MM1 creating unit 2C is depicted in FIG. 9. The MM1 creating unit 2C stores the data of the created meta judgment model (MM1) in the model DB 7 as data 71.

Figure 11:
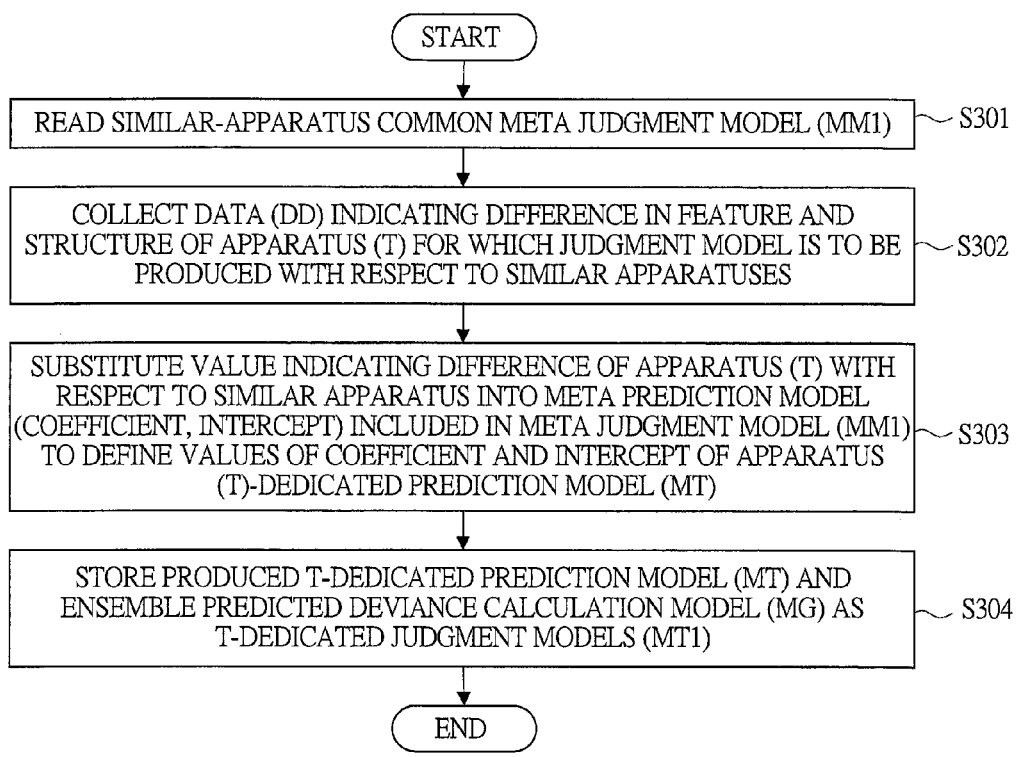
FIG. 11 is a diagram depicting a process flow of an individual-apparatus (T)-dedicated judgment model production module in the first embodiment.

The data 71 of the meta judgment model (MM1) described above is used to create a judgment model (MT1: which includes the prediction model (MT) and the ensemble model (MTG) (described further below)) dedicated to the newly-installed apparatus (T)1T to be monitored in the individual-apparatus (T)-dedicated judgment model (MT1) producing unit 2G. A process flow of the MT1 producing unit 2G is depicted in FIG. 11. The MT1 producing unit 2G stores data of the produced T-dedicated judgment model (MT1) in the model DB 7 as data 72.

<Judgment Module>

Figure 7:
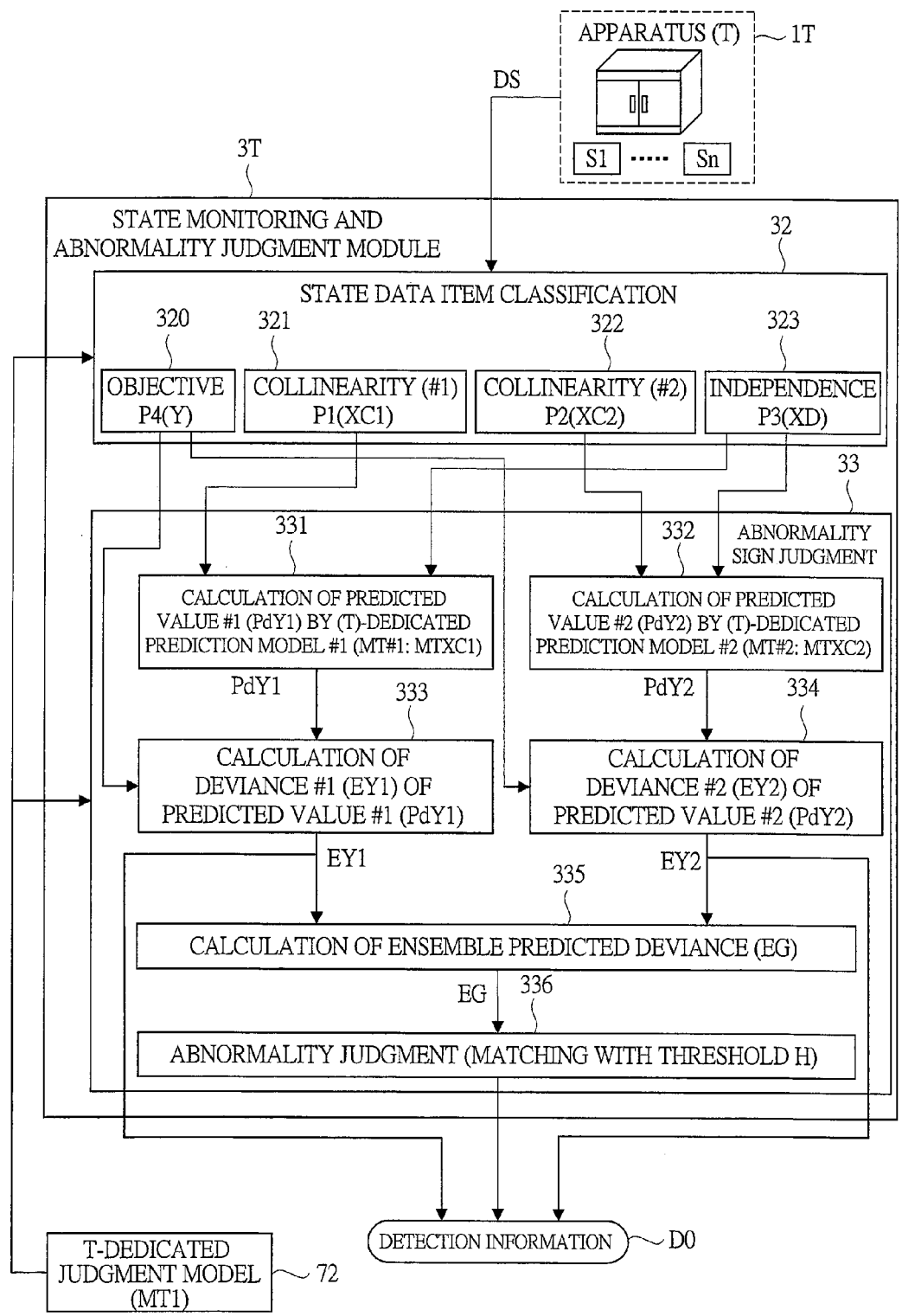
FIG. 7 is a diagram depicting a detailed structure regarding a state monitoring and abnormality judgment module targeted for a first apparatus (T) in the first embodiment.

Next, FIG. 7 depicts a detailed structure of a state monitoring and abnormality judgment module 3T in which a newly-installed apparatus (T)1T to be monitored is assumed.

The judgment module 3T has a data item classifying unit 32 and an abnormality sign judging unit 33 as processing units. In these processing units, the data 72 of the individual-apparatus (T)-dedicated judgment model (MT1) produced by the judgment model creation module 2 (that is, an MT1 creation module) for the apparatus (T)1T and stored in the storage module (model DB 7) is inputted for use.

In the data item classifying unit 32, based on the data 72 of the individual-apparatus (T)-dedicated judgment model (MT1), items of the state data (DS) from the plurality of sensors S of the apparatus (T) are classified. This example shows the case in which the data items P1 to P4 are classified into P1: a first collinearity explanatory variable (XC1) 321, P2: a second collinearity explanatory variable (XC2) 322, P3: an independence explanatory variable (XD) 323, and P4: an objective variable (Y) 320.

The abnormality sign judging unit 33 has, as processing units, a first (#1) predicted value (PdY1) calculating unit 331 based on the first (#1) T-dedicated prediction model (MT#1: MTXC1), a second (#2) predicted value (PdY2) calculating unit 332 based on the second (#2) T-dedicated prediction model (MT#2: MTXC2), a first (#1) predicted value deviance (EY1) calculating unit 333, a second (#2) predicted value deviance (EY2) calculating unit 334, an ensemble predicted deviance (EG) calculating unit 335, and an abnormality judging unit 336 using the matching with a threshold (H).

The PdY1 calculating unit 331 calculates a first (#1) predicted value (PdY1) from XC1 (321) and XD (323) based on the first (#1) prediction model (MT#1: MTXC1). The PdY2 calculating unit 332 calculates a second (#2) predicted value (PdY2) from XC2 (322) and XD (323) based on the second prediction model (MT#2: MTXC2).

The EY1 calculating unit 333 calculates a deviance (first predicted deviance: EY1) of PdY1 from Y (320) and the first predicted value (PdY1). The EY2 calculating unit 334 calculates a deviance (second predicted deviance: EY2) of PdY2 from Y (320) and the second predicted value (PdY2).

The EG calculating unit 335 calculates an ensemble predicted deviance (EG) from the first and second predicted deviances (EY1 and EY2). The abnormality judging unit 336 compares and matches the ensemble predicted deviance (EG) with the threshold (H) to perform abnormality judgment. Then, information including the result of the abnormality judgment (presence or absence of abnormality) and the first and second predicted deviances (EY1 and EY2) is outputted as detection information (D0).

<Individual-Apparatus-Dedicated Judgment Model Creating Process>

Next, FIG. 8 depicts a process flow of creating an a-dedicated judgment model (Ma1) by, for example, the individual-apparatus (a)-dedicated judgment model (Ma1) creating unit 2Sa of the judgment model creation module 2 (S represents a process step). A main body of each process step is the program (2SP) corresponding to the processing unit (2Sa).

At S101, history data of the state measurement data DS of the apparatus (a)1a to be processed is collected.

At S102, by the data item classifying unit 22, the object variable (Y) and the explanatory variable (X) are designated (classified) from each of the plurality of state data items of the data (DS) of the apparatus (a)1a.

At S103, by the data item classifying unit 22, the explanatory variables (X) are classified into a collinearity mode and an independence mode with respect to the objective variable (Y). More specifically, the explanatory variables are classified into the collinearity explanatory variables (XC: XC1 and XC2) and the independence explanatory variable (XD) described above.

At S104, by the prediction model (Ma) constructing unit 23, the collinearity explanatory variables (XC: XC1 and XC2) and the independence explanatory variable (XD) are combined to create individual-apparatus (a)-dedicated prediction models (Ma: Ma#1 (MaXC1), . . . ) with respect to the objective variable (Y) of each collinearity explanatory variable (XC) for as many as the number of (two in this example) collinearity explanatory variables (XC).

An example in which the individual-apparatus-dedicated prediction model (general) is represented by a linear regression equation is depicted in Equation (1). The meanings of signs in Equation (1) are as follows, that is, $Y^{pred}$: a predicted value of the objective variable (Y), $X_C$: a measurement value of collinearity explanatory variable (XC), $X_D$: a measurement value of the independence explanatory variable (XD), $a_C$: a coefficient (AC) with respect to the collinearity explanatory variable (XC), $a_D$: a coefficient (AD) with respect to the independence explanatory variable (XC), b: an intercept (B) of an objective variable (Y) prediction equation, t: a data collection time (sampling number), p: an identification sign of the collinearity explanatory variable data item (XC), q: an identification sign of the independence explanatory variable data item (XD), and m: an identification sign of the apparatus 1.

[Equation 1]

$$Y^{pred}(t, p, m) = a_C(p, m) \cdot X_C(t, p, m) + \sum_q a_D(p, q, m) \cdot X_D(t, q, m) + b(p, m) \quad (1)$$

That is, based on Equation (1), for example, the first prediction model (Ma#1: MaXC1) corresponding to a combination of XC1 and XD for the apparatus (a)1a described above is represented by Equation (2), and also the second prediction model (Ma#2: MaXC2) corresponding to a combination of XC2 and XD is represented by Equation (3). Note that the identification sign m=a of the apparatus (a) and the coefficient A ($a_C$) and others are different, and the identification sign m=b of the apparatus (b) and the intercept B(b) and others are different.

[Equation 2]

$$Y^{pred}(t, p1, a) = a_C(p1, a) \cdot X_C(t, p1, a) + \sum_q a_D(p1, q, a) \cdot X_D(t, q, a) + b(p1, a) \quad (2)$$

[Equation 3]

$$Y^{pred}(t, p2, a) = a_C(p2, a) \cdot X_C(t, p2, a) + \sum_q a_D(p2, q, a) \cdot X_D(t, q, a) + b(p2, a) \quad (3)$$

If these coefficients (AC and AD) and intercept (B) of the linear regression equation are found from the history data (Y, XC, and XD) by the least square method, the MCMC method, or others, an individual-apparatus-dedicated prediction model can be obtained. However, for this prediction model, not only the linear regression equation but also a non-linear regression equation, a regression tree, or the like can be used.

At S105, by the ensemble predicted deviance calculation model (MaG) constructing unit 24, an ensemble predicted deviance calculation model (MG: for example, MaG corresponding to the apparatus (a)) for calculating an ensemble predicted deviance (EG), which is a value obtained by combining and consolidating deviances (predicted deviance: EY) between predicted values (PdY) of each of the plurality of prediction models (Ma: MaXC1 and MaXC2) and a measurement value (Y), is constructed. The predicted deviance (EY) (general) is represented by Equation (4). Meanings of signs in Equation (4) are as follows, that is, EY: a deviance value (predicted deviance) of the objective variable (Y), $Y^{meas}$: a measurement value of the objective variable (Y), and $Y^{pred}$: a predicted value of the objective variable (Y).

[Equation 4]

$$EY(t,p,m) = Y^{pred}(t,p,m) - Y^{meas}(t,m) \quad (4)$$

Specifically, for example, a predicted deviance (EY: EY1) corresponding to a combination of XC1 and XD for the apparatus (a)1a is calculated from Equation (5) and also a predicted deviance (EY: EY2) corresponding to a combination of XC2 and XD is calculated from Equation (6).

[Equation 5]

$$EY(t,p1,a) = Y^{pred}(t,p1,a) - Y^{meas}(t,a) \quad (5)$$

[Equation 6]

$$EY(t,p2,a) = Y^{pred}(t,p2,a) - Y^{meas}(t,a) \quad (6)$$

An ensemble predicted deviance calculation model (MG) (general) in the case where the ensemble predicted deviance (EG) is assumed to be a total of standardized values of the respective predicted deviances (EY) is represented by Equation (7).

[Equation 7]

$$EG(t,m) = \int \{EY(t,p,m)\} \quad (7)$$
$$= \max_p \left\{ \frac{1}{\Delta EY(p,m)} \cdot |EY(t,p,m)| \right\}$$

Specifically, it is represented by Equation (8) as a sum of the calculation results of Equation (5) and Equation (6).

[Equation 8]

$$EG(t,a) = \max \left\{ \begin{array}{l} \frac{1}{\Delta EY(p1,a)} \cdot |EY(t,p1,a)|, \\ \frac{1}{\Delta EY(p2,a)} \cdot |EY(t,p2,a)| \end{array} \right\} \quad (8)$$

Coefficients in Equation (7) and Equation (8) are to standardize the predicted deviance (EY), and are calculated in advance from the predicted deviance (EY) in a time section in which each apparatus 1 is in a normal state.

At S106, the constructed ensemble predicted deviance calculation model (for example, MaG) described above is stored together with data of the individual-apparatus-dedicated prediction model (Ma) described above in the storage module (model DB 7) as data (73) of the individual-apparatus (a)-dedicated judgment model (Ma1).

With the history data being accumulated in the storage module, the prediction model (Ma) and the ensemble predicted deviance calculation model (MaG) described above are similarly created also for another similar apparatus 1 (for example, (b)1b) to be a target for creating an individual judgment model. For example, data 74 of the individual-apparatus (b)-dedicated judgment model (Mb1) is similarly stored in the storage module (model DB 7).

<Meta Judgment Model Creation Process>

Next, FIG. 9 depicts a process flow of creating a similar-apparatus common meta judgment model (MM1) by the similar-apparatus common meta judgment model (MM1) creating unit 2C of the judgment model creation module 2. A main body of each process step is the program (2CP) corresponding to the processing unit (2C).

At S201, the plurality of (two) individual-apparatus (a and b)-dedicated judgment models (Ma1 and Mb1) described above are collected from the storage module (model DB 7). For example, the judgment model Ma1 (data 73) dedicated to the first individual apparatus (a)1a and the judgment model Mb1 (data 74) dedicated to the second individual apparatus (b)1b are obtained. The a-dedicated judgment model Ma1 includes prediction models (Ma: MaXC1 and MaXC2) for the collinearity explanatory variable data items P1 (XC1) and P2 (XC2). Also, the judgment model Mb1 dedicated to its similar apparatus (b)1b includes prediction models (Mb: MbXC1 and MbXC2) for the collinearity explanatory variable data items P1 (XC1) and P2 (XC2).

At S202, data (apparatus feature and structure data DD) indicating a difference in feature, structure, and others (such as a feature item variable value) among the similar apparatuses 1 (such as T, a, and b) is collected for each apparatus 1 from the apparatus information DB 6.

FIG. 10 depicts an example of the apparatus feature and structure data (DD) (such as the feature item variable value). In particular, an example of data of any of similar apparatuses (such as a and b) other than the apparatus (T)1T to be monitored is depicted. When the target apparatus 1 is a combined heat and power apparatus, for example, whether the type of a driving engine is a gasoline engine, a diesel engine, or a gas engine serves as a difference feature in the case where similar displacement-type internal combustion engines are used. As depicted in FIG. 10, the difference feature is represented by data of three items each taking 1 or 0 for each of the apparatuses 1 (such as a and b).

Also, another example of the difference feature in the case where similar displacement-type internal combustion engines are used includes the difference in whether the logical cycle of the heat engine is an Otto cycle (isometric cycle) or a mirror cycle, and it is similarly represented by data of two items each taking 1 or 0 for each apparatus 1. Furthermore, for example, the difference feature may be the difference in whether fuel to be used is gasoline, light oil, hydrogen, natural gas, or biogas, and it is similarly represented by data of five items. Still further, for example, the difference feature may be the number of engine cylinders, and it is represented by data indicating the number of cylinders for each apparatus 1.

Furthermore, examples of the difference feature in the case where similar electric generators are used include a rated output, a rated revolutions, a rated frequency, a rated voltage, and a rated current of the electric generators, and the difference feature is represented by data taking a rated value for each apparatus 1. Still further, for example, the difference feature may be the difference in whether the type of the electric generator is a synchronous electric generator or an induction electric generator, and it is represented by data of two items each taking 1 or 0 for each apparatus 1.

Still further, examples of the difference feature in the case where similar displacement-type internal combustion engines are used include an average temperature, an average humidity, and an average air pressure at the installation location of the apparatus 1, and the difference feature is represented by data taking the average temperature, the average humidity, and the average air pressure for each apparatus 1, respectively. As the average temperature, the average humidity, and the average air pressure, an average value during a data collection period used for model creation, an annual average value, or others is used.

Note that the feature item variable value of the apparatus is a variable for differentiating the plurality of similar apparatuses 1 (information representing a difference in feature, structure, and environment of each apparatus 1), and although it is different from the concept of the apparatus state measurement data item, variables in both may partially overlap in some cases. Furthermore, the feature item variable value of the apparatus 1 may include information about a state measurement value (such as temperature) in an installation environment of the apparatus 1 or others, and may be associated to other values.

At S203, a similar-apparatus common meta prediction model (MM) which describes (predicts) the parameters (coefficient and intercept) of the prediction models (Ma and Mb) included in the collected individual-apparatus-dedicated judgment models (Ma1 and Mb1) described above for the plurality of (K+1) similar apparatuses 1 by using the feature and structure data (DD) (such as the feature item variable value) among the similar apparatus 1 is created.

An example in which a meta prediction model for the coefficient (AC) of the collinearity explanatory variable (XC) of the first term in Equation (1) which is a parameter of the prediction model is represented by a linear regression equation is shown in Equation (9). The meanings of signs in Equation (9) are as follows, that is, $\phi$: a feature item variable value of the apparatus 1, $\alpha_C$: a meta coefficient of a coefficient $a_C$ prediction equation, $\beta_C$: a meta intercept of the coefficient $a_C$ prediction equation, $\pi$: an identification sign of the feature item variable of the apparatus 1, and p: an identification sign of the collinearity explanatory variable data item (XC).

[Equation 9]
$$a_C(p, m) = \sum_{\pi} \alpha_C(p, \pi) \cdot \phi(\pi, m) + \beta_C(p) \tag{9}$$

Also, an example in which a meta prediction model for the coefficient (AD) of the independence explanatory variable (XD) of the second term is represented by a linear regression equation is shown in Equation (10). The meanings of signs in Equation (10) are as follows, that is, $\alpha_D$: a meta coefficient of a coefficient $a_D$ prediction equation, $\beta_D$: a meta intercept of the coefficient $a_D$ prediction equation, and q: an identification sign of the independence explanatory variable data item (XD).

[Equation 10]
$$a_D(p, q, m) = \sum_{\pi} \alpha_D(p, q, \pi) \cdot \phi(\pi, m) + \beta_D(p, q) \tag{10}$$

Still further, an example in which a meta prediction model for the intercept (B) of the third term is represented by a linear regression equation is shown in Equation (11). The meanings of signs in Equation (11) are as follows, that is, $\alpha_O$: a meta coefficient of an intercept b prediction equation and $\beta_O$: a meta intercept of the intercept b prediction equation.

[Equation 11]
$$b(p, m) = \sum_{\pi} \alpha_0(p, \pi) \cdot \phi(\pi, m) + \beta_0(p) \tag{11}$$

Specifically, the meta prediction model for the coefficient (AC) in Equation (9) has a relation of Equation (12) with respect to the apparatuses (a)1a,(b)1b,and others described above for the first collinearity explanatory variable data item (XC1 (P1)).

[Equation 12]
$$\begin{cases} a_C(p1, a) = \sum_{\pi} \alpha_C(p1, \pi) \cdot \phi(\pi, a) + \beta_C(p1) \\ a_C(p1, b) = \sum_{\pi} \alpha_C(p1, \pi) \cdot \phi(\pi, b) + \beta_C(p1) \\ \vdots \end{cases} \tag{12}$$

Also, the meta prediction model for the coefficient (AD) in Equation (10) has a relation of Equation (13) with respect to the apparatuses (a)1a,(b)1b,and others described above for the collinearity explanatory variable data item (XC1 (P1)).

[Equation 13]
$$\begin{cases} a_D(p1, q, a) = \sum_{\pi} \alpha_D(p1, q, \pi) \cdot \phi(\pi, a) + \beta_D(p1, q) \\ a_D(p1, q, b) = \sum_{\pi} \alpha_D(p1, q, \pi) \cdot \phi(\pi, b) + \beta_D(p1, q) \\ \vdots \end{cases} \tag{13}$$

Furthermore, the meta prediction model for the intercept (B) in Equation (11) has a relation of Equation (14) with respect to the apparatuses (a)1a,(b)1b,and others described above for the collinearity explanatory variable data item (XC1 (P1)).

[Equation 14]
$$\begin{cases} b(p1, a) = \sum_{\pi} \alpha_0(p1, \pi) \cdot \phi(\pi, a) + \beta_0(p1) \\ b(p1, b) = \sum_{\pi} \alpha_0(p1, \pi) \cdot \phi(\pi, b) + \beta_0(p1) \\ \vdots \end{cases} \tag{14}$$

These relational equations can be solved by using such means as the minimum square method or the MCMC method, and the meta prediction model (MM) described above can be created. However, for the meta prediction model described above, not only the linear regression equation but also a non-linear regression equation, a regression tree, or the like can be used. The second collinearity explanatory variable data item (XC2 (P2)) can also be solved in a similar manner.

At S204, the created similar-apparatus common meta prediction model (MM: each meta prediction model regarding AC, AD, and B) is stored in the storage module (model DB 7) as the data 71 of the similar-apparatus common meta judgment model (MM1) together with the ensemble predicted deviance calculation models (MG: MaG and MbG) included in the individual judgment models (Ma1 and Mb1) described above.

<Individual-Apparatus (T)-Dedicated Judgment Model Producing Process>

Next, FIG. 11 depicts a process flow of producing an individual-apparatus (T)-dedicated judgment model (MT1) from the similar-apparatus common meta judgment model (MM1) by the individual-apparatus (T)-dedicated judgment model (MT1) producing unit 2G of the judgment model creation module 2. A main body of each process step is the program (2GP) corresponding to the processing unit (2G).

At S301, the meta judgment model (MM1) described above is read from the storage module (model DB 7). This meta judgment model (MM1) includes the meta prediction model (MM: each meta prediction model regarding AC, AD, and B) and the ensemble predicted deviance calculation model (MG).

At S302, the apparatus feature and structure data (DD) of the apparatus (T)1T for which the judgment model (MT1) is to be produced with respect to the similar apparatuses 1 (such as a and b) is collected from the apparatus information DB 6.

When the target apparatus (T)1T is a combined heat and power apparatus, examples of this apparatus feature and structure data (DD) (and the apparatus feature item variable value included therein) include, similarly to those described above, the type of the driving engine, the logical cycle of the heat engine, the fuel to be used, the number of engine cylinders, the rated output, rated revolutions, rated frequency, rated voltage, and rated current of the electric generator, and the average temperature, average humidity, and average air pressure at the installation location of the apparatus.

At S303, a value indicating the difference of the target apparatus (T)1T with respect to the similar apparatus 1 (feature item variable value) is substituted into the meta prediction model (MM) (AC in Equation (9), AD in Equation (10), and B in Equation (11)) included in the meta judgment model (MM1) to define coefficient values (AC and AD) and a value of the intercept (B) of the T-dedicated prediction model (MT) produced for each of the explanatory variable data items (X) (p and q). By this means, for the target apparatus (T)1T, the individual-apparatus-dedicated prediction models (MT: MT#1 (MTXC1) and MT#2 (MTXC2)) in Equation (1) are produced as shown in Equation (15) and Equation (16).

[Equation 15]

$$Y^{pred}(t, p1, T) = a_C(p1, T) \cdot X_C(t, p1, T) + \sum_q a_D(p1, q, T) \cdot X_D(t, q, T) + b(p1, T) \quad (15)$$

[Equation 16]

$$Y^{pred}(t, p2, T) = a_C(p2, T) \cdot X_C(t, p2, T) + \sum_q a_D(p2, q, T) \cdot X_D(t, q, T) + b(p2, T) \quad (16)$$

At S304, the produced individual-apparatus (T)-dedicated prediction model (MT) and the ensemble predicted deviance calculation model (MG) are stored as the data 72 of the individual-apparatus (T)-dedicated judgment models (MT1) in the storage module (model DB 7).

<State Monitoring and Abnormality Judging Process>

Figure 12:
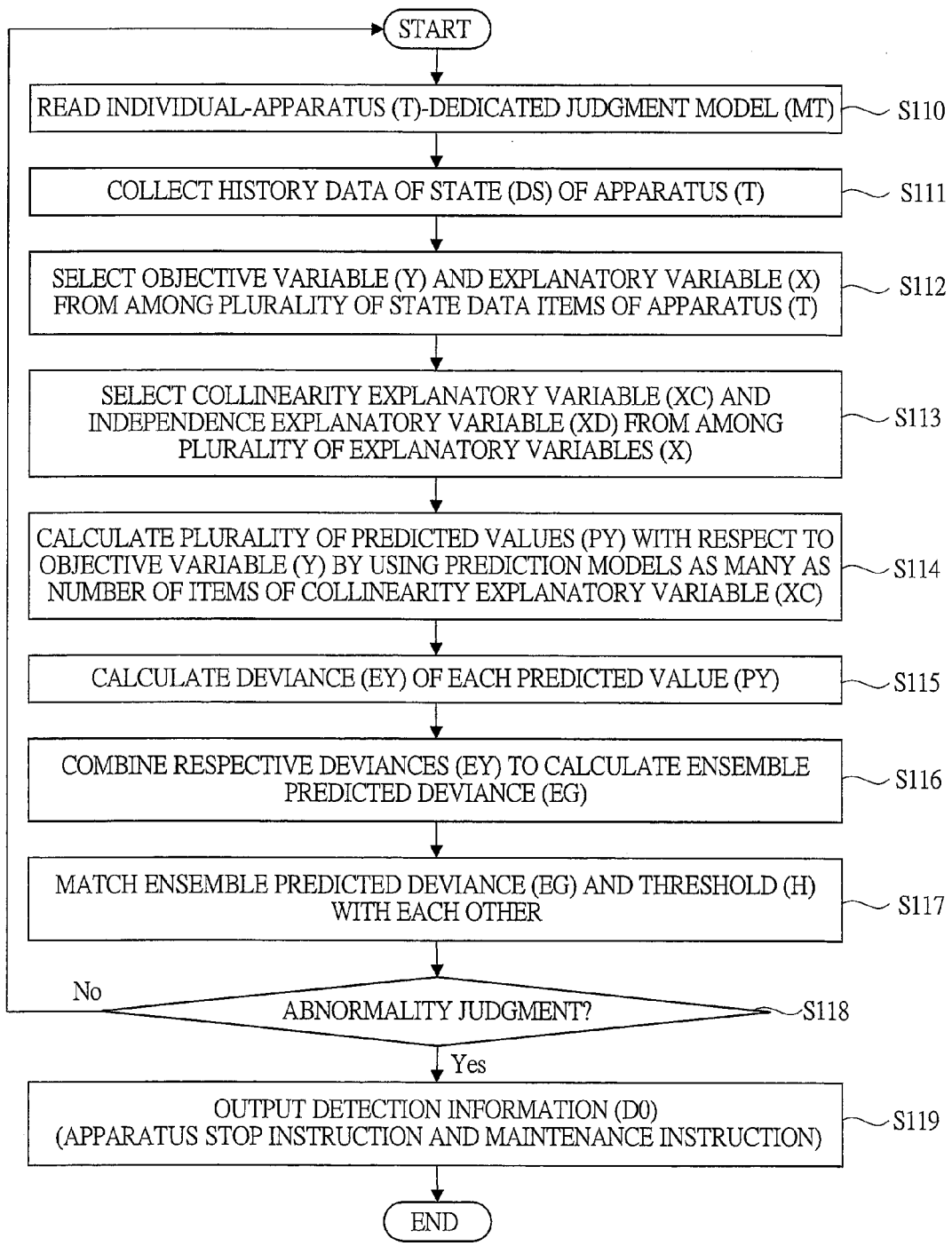
FIG. 12 is a diagram depicting a process flow of a state monitoring and abnormality judgment module targeted for the first apparatus (T) in the first embodiment.

Next, FIG. 12 depicts a process flow of state monitoring and abnormality judgment of the target apparatus (T)1T by the judgment module 3T. A main body of each process step is the program (3P) corresponding to the module (3T).

At S110, the data 72 of the individual-apparatus (T)-dedicated judgment models (MT1) for the monitoring target apparatus (T)1T is read from the storage module (model DB 7). The T-dedicated judgment model (MT1) includes the T-dedicated prediction models (MT: MTXC1 and MTXC2) and the ensemble predicted deviance calculation model (MG).

At S111, history data of the state measurement data DS of the apparatus (T)1T is collected.

At S112, by the data item classifying unit 32, from among each of the plurality of state data items of the data (DS) of the apparatus (T)1T, objective variables (Y) and explanatory variables (X) are selected in accordance with the designation of the judgment model (MT1).

At S113, by the data item classifying unit 32, from among the plurality of explanatory variables (X), collinearity explanatory variables (XC: XC1 and XC2) and an independence explanatory variable (XD) with respect to the objective variables (Y) are selected in accordance with the designation of the judgment model (MT1).

At S114, by the abnormality sign judging unit 33, by using a plurality of (two) prediction models (MT) as many as the number of items of the collinearity explanatory variable (XC), a plurality of (two) predicted values (PdY: PdY1 and PdY2) with respect to the objective variables (Y) are calculated based on Equation (15) and Equation (16).

At S115, a deviance (EY: EY1 and EY2) of each of the predicted values (PdY: PdY1 and PdY2) with respect to the measurement values of the objective variables (Y) is calculated based Equation (17) and Equation (18).

[Equation 17]

$$EY(t,p1,T) = Y^{pred}(t,p1,T) - Y^{meas}(t,T) \quad (17)$$

[Equation 18]

$$EY(t,p2,T) = Y^{pred}(t,p2,T) - Y^{meas}(t,T) \quad (18)$$

At S116, by the ensemble predicted deviance (EG) calculating unit 335, the respective deviances (EY: EY1 and EY2) are combined to calculate the ensemble predicted deviance (EG) based on Equation (19).

[Equation 19]

$$EG(t, T) = \max \left\{ \begin{array}{l} \frac{1}{\Delta EY(p1, T)} \cdot |EY(t, p1, T)|, \\ \frac{1}{\Delta EY(p2, T)} \cdot |EY(t, p2, T)| \end{array} \right\} \quad (19)$$

At S117, the matching and comparison of the ensemble predicted deviance (EG) and the threshold (H) are performed. At S118, based on the comparison result, an abnormality judgment is made. When an abnormality is present (Yes), detection information (D0) is outputted at S119. Examples of the detection information (D0) include an apparatus stop instruction information (D1), the maintenance instruction information (D2), and others.

<Example of Producing Individual-Apparatus (T)-Dedicated Judgment Model>

Next, an example of production of the individual-apparatus (T)-dedicated judgment model (MT1) and others will be described. In the following, a measurement value (Y) of the objective variable (Y) in the above-described apparatus state measurement data DS, a similar-apparatus common meta prediction model (meta prediction model regarding AC), a prediction value (PdY) of the produced individual-apparatus (T)-dedicated prediction model (MT), and others are described based on the examples thereof.

Figure 13A:
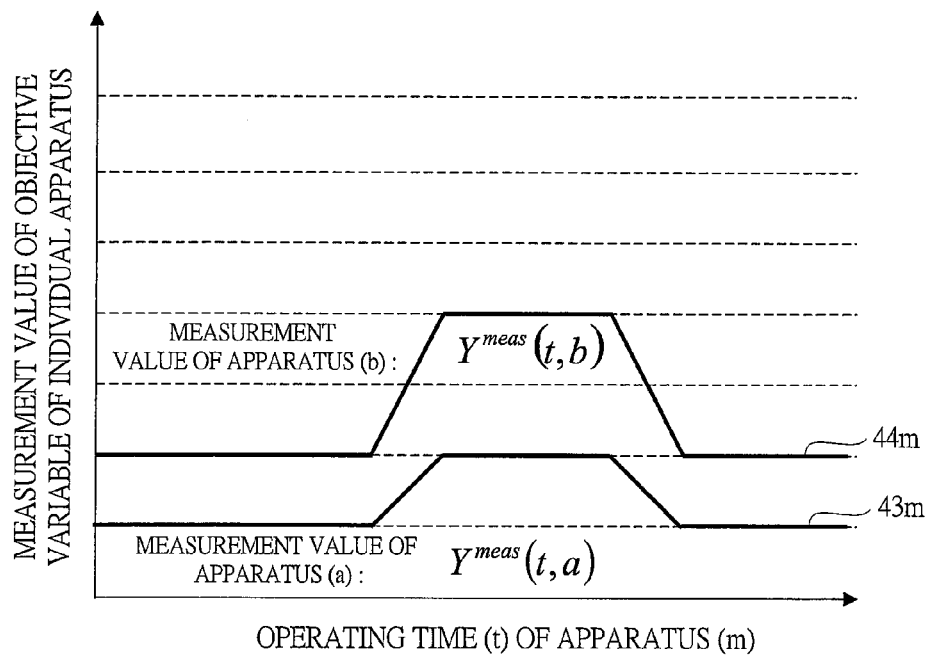

FIG. 13A depicts transitions of the measurement value (Y) of the objective variable data item (such as an apparatus output) of the state measurement data DS for two already-installed individual similar apparatuses (a)$1a$ and (b)$1b$. The vertical axis represents a measurement value (Y) of the objective variable data item. Also, the horizontal axis represents an operating time (t) of the apparatus (m). $43m$ indicates a line of a measurement value (Y) ($Y^{meas}$) of the apparatus (a), and $44m$ indicates a line of a measurement value (Y) ($Y^{meas}$) of the apparatus (b) having an output larger than that of the apparatus (a). In this example, since the individual apparatuses (a) and (b) operate in the same cycle, they have the same changing point, but this is not meant to be restrictive.

Figure 13B:
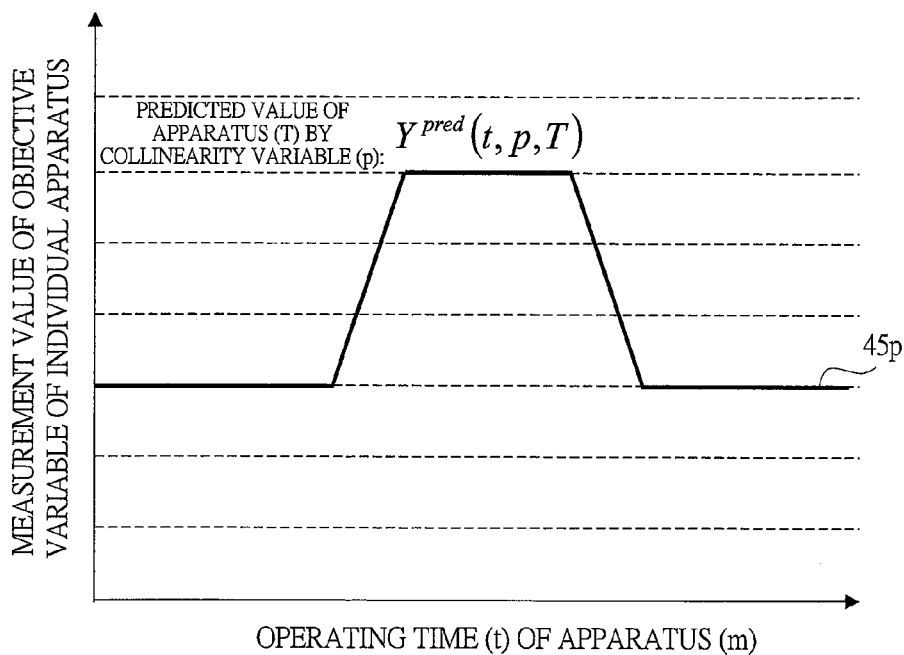

FIG. 13B depicts transitions of the predicted value (PdY) based on the collinearity explanatory variable data item (XC) (p) of the objective variable data item (Y) of the state measurement data DS for the newly-installed apparatus (T)1T. The vertical axis represents a predicted value of the objective variable data item (Y). Also, the horizontal axis represents an operating time of the apparatus (m=T). $45p$ indicates a line of a predicted value (PdY) ($Y^{pred}$) of the newly-installed apparatus (T)1T having an output larger than that of the already-existing two apparatuses (a and b). In this example, the newly-installed apparatus (T) operates in the same cycle as that of the similar apparatuses (a) and (b), but this is not meant to be restrictive.

FIG. 14A depicts measurement values of the coefficient of the individual-apparatus-dedicated prediction model constructed from the measurement data for each of the plurality of individual apparatuses 1 (a, b, c, d, . . .). The vertical axis represents a value ($a_C$ (p, m)) of the coefficient (AC) with respect to the collinearity explanatory variable (XC1) of the first term of the individual-apparatus-dedicated prediction model in Equation (1) constructed from the measurement data. The horizontal axis represents a feature item value for each of the similar apparatuses 1. Plots $53a$, $53b$, $53c$, and $53d$ represent coefficient values with respect to the feature item values of the apparatuses (a), (b), (c) and (d), respectively. In this example, the case in which the number of feature item values of the apparatus 1 is one is shown, but a plurality of feature item values can be presented. A straight line denoted by 141 represents a similar-apparatus common meta prediction model by a linear regression equation of FIG. 14B (based on Equation (9)).

FIG. 14B depicts predicted values for the apparatus feature item value of a coefficient of the individual-apparatus (T)-dedicated prediction model (MT) predicted from the similar-apparatus common meta prediction model (MM). The vertical axis represents a value of the coefficient (AC) with respect to the collinearity explanatory variable (XC1) of the first term of the prediction model in Equation (1) predicted from the meta prediction model (MT) (141). The horizontal axis represents a feature item value for each apparatus 1.

FIG. 15A depicts transitions of the measurement value (PdY) with superposing it on the predicted value (PdY) based on the collinearity explanatory variable (XC) (p) of the objective variable data item (Y) of the state measurement data DS of the newly-installed apparatus (T). The vertical axis represents a predicted value of the objective variable data item (Y). Also, the horizontal axis represents an operating time (t) of the apparatus (m=T). $45p$ (dotted line) represents the predicted value (PdY) of the apparatus (T), and also $45m$ (solid line) represents a measurement value (Y). In this example, since prediction is made from the collinearity explanatory variable data item (XC) whose changing point temporally precedes the objective variable data item (Y), the predicted value (PdY) temporally precedes the measurement value (Y).

FIG. 15B depicts transitions of a deviance value (deviance: EY) between the predicted value (PdY) and the measurement value (Y). The vertical axis represents the deviance value (EY) (line denoted as $45e$) of the objective variable data item (Y). Also, the horizontal axis represents an operating time (t) of the apparatus (m=T). Since the predicted value (PdY) temporally precedes the measurement value (Y), a positive deviance value $46ep$ occurs at a rising edge, and a negative deviance value $46em$ occurs at a trailing edge. If FIG. 15B is assumed to represent transitions of the deviance value in a normal state of the apparatus (T), the standardized coefficients in Equation (7) and Equation (8) can be obtained from the deviance values $46ep$ and $46em$ as, for example, their average values.

If a linear regression equation with respect to the plots ($53a$ to $53d$) of FIG. 14A described above is found by, for example, the least square method, a meta coefficient (gradient) $141a$ and a meta intercept (intercept) $141b$ are determined, thereby obtaining a meta prediction model (141) for predicting the coefficient (AC) with respect to the collinearity explanatory variable (XC) in Equation (9). Similarly, though not shown in the drawing, also for the coefficient (AD) with respect to the independence explanatory variable (XD) in Equation (10) and the intercept in Equation (11), a meta prediction model for predicting them can be obtained.

If a feature item value 55T ($\phi(\pi, T)$) of the apparatus (T) is substituted into the created similar-apparatus common meta prediction model (141) described above, as depicted in FIG. 14B, a meta predicted value 56T (predicted value of the coefficient ($a_C$(p, T)) of the apparatus (T)) is determined. The meta predicted value 56T is substituted into the coefficient (AC) with respect to the collinearity explanatory variable (XC1) of the first term of the T-dedicated prediction model in Equation (1). Similarly, though not shown in the drawing, also the coefficient (AD) and the intercept (B) with respect to the independence explanatory variable (XD) of the second term can be obtained by obtaining a predicted value from the meta prediction model for predicting them and substituting the predicted value. From the above, the individual-apparatus (T)-dedicated prediction model (MT) in Equation (1) is produced.

From the produced individual-apparatus (T)-dedicated prediction model (MT) described above, as depicted in FIG. 13B, the predicted value (PdY) of the objective variable data item (Y) can be calculated according to Equation (15). As depicted in FIG. 15A and FIG. 15B, from these predicted value (PdY) and measurement value (Y), the deviance can be calculated according to Equation (17). Similarly, also for another collinearity explanatory variable (XC2), the deviance can be calculated from Equation (16) and Equation (18). From these deviances, the ensemble deviance can be calculated according to Equation (19).

When a time preceding interval of the predicted value (PdY) with respect to the measurement value (Y) depicted in FIG. 15A is widened or a mismatch between the predicted value (PdY) and the measurement value (Y) occurs, a deviance value (abnormality deviance) in an abnormal state larger than the deviance value in a normal state is produced. By matching the ensemble deviance including this abnormality deviance with a threshold, the presence or absence of an abnormality in the apparatus (T) can be judged.

The foregoing is the abnormality judging function of the first embodiment.

Second Embodiment

Next, an apparatus abnormality monitoring method and its system of a second embodiment of the present invention will be described with reference to FIG. 2, FIG. 16 to FIG. 22, and others. In the second embodiment, in addition to the process of performing state monitoring and abnormality judgment in the first embodiment, a process of abnormality cause diagnosis regarding an apparatus where an abnormality judgment (detection) has been made, and other processes are preformed. Process steps up to the abnormality judgment (detection) are similar to those of the first embodiment.

<Abnormality Cause Diagnosing Process>

Based on the system structure of the second embodiment (FIG. 2), an abnormality cause diagnosing process using the diagnosis module 5T and others for the apparatus (T)1T where an abnormality has been detected in the abnormality judging process (FIG. 12) is described with reference to FIG. 16 and subsequent drawings.

<Individual-Apparatus-Dedicated Diagnostic Model Creating Process>

First, FIG. 16 depicts a process flow of creating diagnostic models (Ma2 and Mb2) by the individual-apparatus (a and b)-dedicated diagnostic model (Ma2 and Mb2) creating units 4Sa and 4Sb in the diagnostic model creation module 4 of FIG. 2 (by way of example, the case of creating Ma2 by 4Sa is depicted). A main body for each process step is the program (4SP) corresponding to the processing unit (such as 4Sa).

At S401, history data of the state (DS) of the apparatus (a) 1a to be processed is collected retroactively from the time point when the abnormality is detected.

At S402, from the history data in a normal operating section of the apparatus (a)1a, a normal graphical model (normal graph network model) among the state data items is created.

The normal graphical model can be created by, for example, determining the presence or absence of a causal relation from a correlation strength between the state data items and determining a causal direction from time precedence information between the state data items regarding the occurrence of the changing point. When many variables have mutual relations, a partial correlation strength in which influences of other variables (signal components) are excluded can be suitably used in place of the correlation strength. Note that, in a process of excluding influences of other variables (signal components), in order to prevent introduction of an erroneous causal relation by calculating a partial correlation strength between minute noise signals, it is suitable to calculate a change rate of a signal strength before and after the process of excluding influences of other variables (signal components) and take the product of the partial correlation strength and the change rate of the signal strength as an index of the causal relation.

FIG. 17A depicts an example of a normal graphical model. In this example, since the correlation strength between the first collinearity explanatory variable data item P1 (XC1) selected previously as the explanatory variable (X) and the objective variable data item P4 (Y) is as high as 0.8, a causal link 131a is set up between these P1 and P4, and furthermore, based on the time precedence information between the state data items regarding the occurrence of the changing point, a causal direction (direction of an arrow of the link 131a) is determined. For example, specifically, as depicted in FIG. 15 described above, from a difference deviance value (EY) between the predicted value (PdY) and the measurement value (Y) of P4 (Y) based on P1 (XC1), time precedence information can be obtained, and from that information, the causal direction is determined as a direction from P1 (XC1) to P4 (Y). Similarly, since the correlation strength between the second collinearity data item P2 (XC2) and P4 (Y) is as high as 0.9, a causal link 132a is set up, and furthermore, based on the time precedence information, the causal direction is determined as a direction from P2 (XC2) to P4 (Y). Similarly, since the correlation strength between P1 (XC1) and P2 (XC2) is as high as 0.9, a causal link 133a is set up, and furthermore, based on the time precedence information, the causal direction is determined as a direction from P1 (XC1) to P2 (XC2).

At S403, from history data in an abnormal operating section of the apparatus (a)1a, an abnormal graphical model among the state data items (abnormal graph network model) is created. The abnormal graphical model can be achieved in a manner similar to the creation of the normal graphical model described above.

FIG. 17B depicts an example of an abnormality graphical model. In this example, the correlation strength between the first collinearity explanatory variable data item P1 (XC1) previously selected as the explanatory variable (X) and the objective variable data item P4 (Y) is decreased to 0.45 compared with a normal case of FIG. 17A, and the causal link 131b disappears (dotted line). Since the correlation strength between the second collinearity data item P2 (XC2) and P4 (Y) is still as high as 0.9, the causal link 132b remains, and further based on time precedence information between the state data items regarding the occurrence of a changing point to an abnormality, the causal direction is determined as a direction from P2 (XC2) to P4 (Y). Similarly, the correlation strength between P1 (XC1) and P2 (XC2) is decreased to 0.5, and the causal link 133b disappears.

At S404, a difference between the normal graphical model (FIG. 17A) and the abnormal graphical model (FIG. 17B) is extracted. By taking this difference, the link between the first collinearity explanatory variable data item P1 (XC1) and the objective variable data item P4 (Y) and the link between P1 (XC1) and the second collinearity explanatory variable data item P2 (XC2) are extracted. By this means, a difference diagnostic model 136 as depicted in FIG. 18 can be obtained.

In FIG. 18, 135 denotes an example of data information regarding the individual-apparatus (T)-dedicated diagnostic model (MT2), and it includes an apparatus feature item 137 and a difference diagnostic model 136. The information of the apparatus feature item 137 is a feature item variable value that is based on the apparatus feature and structure data DD and allows the apparatus (T) to be distinguished from among the similar apparatuses 1, and as described in the example above, it includes information about type and model of the apparatus (T), information about an installation environment of the apparatus (T), and others. The information of the difference diagnostic model 136 is based on the model of FIG. 17, in which 136a denotes information about a normal difference model and 136b denotes information about an abnormal difference model. Also, 136c denotes information about causes of previous cases (abnormal cases) reprinted in relation to the similar apparatus 1 and its difference diagnostic model. This information about causes (136c) includes, for example, "abnormality of P1 (XC1)", "associated parts of P1: [part 11, part 12, . . . ]", and others, and these serve as presumed abnormality causes and maintenance target points (presumed abnormality points). Note that the unit of target points is not limited to a part but may be a module, an apparatus, or others.

A diagnosis (abnormality cause diagnosis) by the diagnosis module 5T is performed by checking a link disappearance change or a link direction change from the normal difference model 136a to the abnormal difference model 136b or the presence or absence of a change in correlation strength by means of pattern matching or the like based on the information described above. When change patterns match, a presumed abnormality cause and information about associated parts to be maintained and others can be obtained from the cause (136c) of the reprinted previous cases.

At S405, information about the graphical model for difference diagnosis (difference diagnostic model 136 of FIG. 18) is stored together with (as being provided with) information about the apparatus feature item values and others (apparatus feature item 137) in the storage module (model DB 8) as information (135) of the individual-apparatus (T)-dedicated diagnostic model (MT2).

<Meta Diagnostic Model Creating Process>

Next, FIG. 19 depicts a process flow of creating a meta diagnostic model (MM2) by the similar-apparatus common meta diagnostic model (MM2) creating unit 4C in the diagnostic model creation module 4 of FIG. 2. A main body of each process step is the program (4CP) corresponding to the processing unit (4C).

At S411, the information about the individual-apparatus (a and b)-dedicated diagnostic models (Ma2 and Mb2) created in the process of FIG. 16 is collected from the storage module (model DB 8) for the plurality of abnormal cases of the plurality of apparatuses 1. This timing maybe periodic or at each abnormality detection.

At S412, the individual-apparatus-dedicated diagnostic models (Ma2 and Mb2) are associated for each apparatus feature item value, and are classified as diagnostic models unique to the apparatus feature item values. Specific details thereof are depicted in FIG. 20A.

In FIG. 20A, in an apparatus feature item summary table 138, with values of apparatus feature items (for example, item names: Nx and Ny and item values: Vx1, Vx2, Vy1, and Vy2) being taken as keys, the individual-apparatus-dedicated diagnostic models (for example, 135-1(A), 135-2(B), and 135-3 (B)) are associated. For example, for the apparatus feature item summary table 138 (feature item values), a first diagnostic model 135-1 (unique diagnostic model (A) 136-1) is associated by Vx1 of Nx and Vy1 of Ny in a feature item 137-1, a second diagnostic model 135-2 (unique diagnostic model (B) 136-2) is associated by Vx2 of Nx and Vy1 of Ny in a feature item 137-2, and a third diagnostic model 135-3 (unique diagnostic model (B) 136-3) is associated by Vx1 of Nx and Vy2 of Ny in a feature item 137-3, respectively. Note that the feature item values taken as keys in the table described above are not limited to single numerical value, but can be a set of a plurality of numerical values and can be a range having an upper-limit numerical value and a lower-limit numerical value.

At S413, an individual-apparatus-dedicated diagnostic model not dependent on the apparatus feature item is classified as a general-purpose diagnostic model. Specifically, for example, second and third diagnostic models 135-2 and 135-3 in FIG. 20A have the same diagnostic model (B) (136-2 and 136-3) but are associated by different item values. In such a case, the model like this is considered to be not related to any feature item value, and as depicted in the second diagnostic model (135-2b) of FIG. 20B, the model is classified as a general-purpose diagnostic model (B) 136-2b associated with all feature item values by a feature item 137-2b.

At S414, the unique diagnostic models and general-purpose diagnostic model for each apparatus feature item value described above are associated with the apparatus feature item summary table 138, and are stored in the storage module (model DB 8) as data 81 of the similar-apparatus common meta diagnostic model (MM2).

<Individual-Apparatus-Dedicated Diagnostic Model Producing Process>

Next, FIG. 21 depicts a process flow of creating a diagnostic model (MT2) by the individual-apparatus (T)-dedicated diagnostic model (MT2) producing unit 4G of the diagnostic model creation module 4 of FIG. 2. A main body of each process step is the program (4GP) corresponding to the processing unit (4G).

At S421, the similar-apparatus common meta diagnostic model (MM2) created in the process of FIG. 19 is read from the storage module (model DB 8).

At S422, the data (DD) including the feature item values of the apparatus (T)1T to be diagnosed is obtained from the apparatus information DB 6.

At S423, a unique diagnostic model matching with the feature item values of the target apparatus (T) is selected. When described with reference to the example of FIG. 20B, in the case where feature item values are a value Vx1 of an item name Nx and a value Vy2 of an item name Ny of the apparatus (T), the first unique diagnostic model (135-1 (136-1(A))) associated with these values is selected. On the other hand, the general-purpose diagnostic model (135-2b) described above not dependent on any feature item value, that is, matching with all apparatuses 1 is selected.

At S424, data information including the unique diagnostic model (135-1) matching with the apparatus (T) described above and the general-purpose diagnostic model (135-2b) matching with all apparatuses 1 is stored in the storage module (model DB 8) as data 82 of the individual-apparatus (T)-dedicated diagnostic model (MT2).

<Abnormality Cause Diagnosing Process>

Next, FIG. 22 depicts a process flow of diagnosing an abnormality cause for the apparatus (T)1T by the diagnosis module 5T. A main body of each process step is the program (5P) corresponding to the module (5T). This diagnosing process is started (triggered) by, for example, an abnormality detection by the judgment module 3T.

At S430, the process waits for the abnormality detection (detection information (D0)) of the judgment module 3T on the apparatus (T)1T.

At S431, history data of the state (DS) of the apparatus (T) is collected retroactively from the time point when the abnormality is detected.

At S432, from the history data in a normal operating section of the apparatus (T), a normal graphical model among the state data items is created.

At S433, from the history data in an abnormal operating section of the apparatus (T), an abnormal graphical model among the state data items is created.

At S434, a difference between the normal graphical model and the abnormal graphical model is extracted.

At S435, the data 82 of the diagnostic model (MT2) for the apparatus (T) is read from the storage module (model DB 8). The data 82 of the diagnostic model (MT2) includes the unique diagnostic model and the general-purpose diagnostic model described above.

At S436, matching of the diagnostic model (MT2) is performed. Specifically, a link disappearance change or a link direction change from the normal difference model 136a to the abnormal difference model 136b of the T-dedicated diagnostic model (135) of FIG. 18 or the presence or absence of a change in correlation strength is checked by means of pattern matching or the like.

At S437, when the change patterns described above match, a presumed abnormality cause and information about a maintenance target position, associated parts, and others (such as the maintenance instruction information D2) are obtained as the detection information (D0) from information about the cause (136c) of the diagnostic model (135).

Based on the diagnosis described above, the diagnosis module 5T transmits the detection information (D0) including the maintenance instruction information (D2) to the maintenance apparatus 54 corresponding to the target apparatus (T)1T and others. Based on the received information (D0), the maintenance apparatus 54 displays the information regarding the presumed abnormality cause and the maintenance target position (such as associated parts) on, for example, a screen by using a maintenance operation instruction program or the like. Also, as required, the maintenance apparatus 54 transmits the information to another system (not shown in the drawing) to perform a process of preparing a part for maintenance and exchange. The maintenance apparatus 54 records the results of maintenance performed by the maintenance operator (U1) as history by a maintenance history recording program. In the manner described above, the maintenance operator can efficiently perform a maintenance operation of the apparatus (T)1T by using the maintenance apparatus 54.

<Apparatus>

The apparatus 1 is not limited to an energy conversion apparatus typified by the combined heat and power apparatus described above. For example, the present invention can be applied to an apparatus that converts wind power or wave power to at least one of kinetic energy and electric energy in place of burning fuel. In this case, as the objective variable (Y), at least one of a motion output, an electric power output, and an energy conversion efficiency of the energy conversion apparatus can be suitably selected. As the explanatory variable (X), at least one of air velocity, motion speed of a mechanical part, vibration of a mechanical part, acceleration of a mechanical part, distortion of a mechanical part, sound of a mechanical part, abrasion loss of a mechanical part, a component of lubricating oil, pressure of lubricating oil, temperature of lubricating oil, voltage of an electrical part, current of an electrical part, frequency of an electrical part, temperature of an environment, humidity of an environment, air pressure of an environment, voltage of an electric power system, current of an electric power system, operating time of an apparatus, and operating time of a part is included.

Also, the present invention can be applied to an apparatus that converts geothermal heat to at least one of kinetic energy, heat energy, and electric energy. In this case, as the objective variable (Y), at least one of a motion output, a heat output, an electric power output, and an energy conversion efficiency in an energy conversion apparatus can be suitably selected. As the explanatory variable (X), at least one of water vapor supply amount, water vapor temperature, water vapor pressure, motion speed of a mechanical part, vibration of a mechanical part, acceleration of a mechanical part, distortion of a mechanical part, sound of a mechanical part, abrasion loss of a mechanical part, a component of lubricating oil, pressure of lubricating oil, temperature of lubricating oil, electric power of an electrical part, reactive power of an electrical part, voltage of an electrical part, current of an electrical part, frequency of an electrical part, temperature of an environment, humidity of an environment, air pressure of an environment, voltage of an electric power system, current of an electric power system, operating time of an apparatus, and operating time of a part, which does not overlap with the objective variable (Y) described above, is included.

Furthermore, the present invention can be applied to an electric motor apparatus that converts electric energy to mechanical energy. An example of the electric motor apparatus includes a lift typified by an elevator and an escalator, a plant apparatus typified by a pump and a compressor, and a machine tool typified by a lathe, a drill press, a milling machine, and a grinding machine. In this case, as the objective variable (Y), at least one of workload of a mechanical part, motion speed of a mechanical part, vibration of a mechanical part, acceleration of a mechanical part, distortion of a mechanical part, sound of a mechanical part, abrasion loss of a mechanical part, and energy conversion efficiency can be suitably selected. As the explanatory variable (X), at least one of motion speed of a mechanical part, vibration of a mechanical part, acceleration of a mechanical part, distortion of a mechanical part, sound of a mechanical part, abrasion loss of a mechanical part, a component of lubricating oil, pressure of lubricating oil, temperature of lubricating oil, electric power of an electrical part, reactive power of an electrical part, voltage of an electrical part, current of an electrical part, frequency of an electrical part, temperature of an environment, humidity of an environment, air pressure of an environment, operating time of an apparatus, and operating time of a part, which does not overlap with at least the objective variable (Y) described above, is included.

Still further, the present invention can be applied to a semiconductor processing apparatus that converts electric energy to mechanical energy or plasma energy. An example of the semiconductor processing apparatus includes a semiconductor CMP (chemical mechanical polishing) apparatus, a semiconductor etching apparatus, and a semiconductor film forming apparatus. In this case, as the objective variable (Y), at least one of process amount or film formation amount of semiconductor, process uniformity or film-formation uniformity in a plane of a semiconductor wafer, and energy conversion efficiency can be suitably selected. As the explanatory variable (X), at least one of abrasion loss of a mechanical part, electric power of an electrical part, reactive power of an electrical part, voltage of an electrical part, current of an electrical part, frequency of an electrical part, impedance of an electrical part, temperature of a semiconductor wafer, temperature of a processing room environment, pressure of a processing room environment, light emission of a processing room environment, operating time of an apparatus, and operating time of a part is included.

<Effects of Embodiments and Others>

As has been described in the foregoing, according to the present embodiments, with the plurality of (K+1) apparatuses 1 being taken as targets, (1) in the first embodiment, a model (judgment model) capable of accurate abnormality detection (judgment) and monitoring using the model can be achieved, and (2) furthermore, in the second embodiment, a model (diagnostic model) capable of accurate cause diagnosis, improvement in maintenance efficiency by means of the diagnosis using the model, the presumption of a component and others can be achieved. In particular, for example, even for a newly-installed apparatus (T) for which accumulation of data required for monitoring and diagnosis has not proceeded, a model capable of accurate abnormality detection and cause diagnosis can be provided by using a model based on data accumulated for the already-installed similar apparatuses (such as a and b).

As for (1) described above, in particular, a model for detecting an abnormality sing of the apparatus from sensor data is produced for the target apparatus based on the common meta judgment model created from the similar apparatus group for which data accumulation has proceeded. By this means, accurate judgment model can be always created for even an apparatus for which data accumulation has not proceeded, for example, for a newly-installed apparatus.

Furthermore, as a model for detecting an abnormality sign of the apparatus from the sensor data, an ensemble of individual models for each collinearity explanatory variable data item is used, and therefore the model can be always stably created.

Still further, by using the ensemble of individual models described above, a linear model and a non-linear model can be present in a mixed manner. More generally, plural types of models can be present in a mixed manner.

As for (2) described above, in particular, a causal analysis based on the diagnostic models is performed with the detection of an abnormality sign of the apparatus as a base point. By this means, the abnormality detection data items can be quickly ranked and associated parts to be candidates for an abnormality cause phenomenon can be specified, so that the improvement in efficiency of the maintenance operation can be achieved.

Also, by managing these diagnostic models in association with the feature item values of each apparatus, a similar-apparatus common meta diagnostic model can be created by combining the diagnostic models dedicated to the apparatuses. By performing the search for this meta diagnostic model with using a feature item value of the target apparatus as a key, an apparatus-dedicated diagnostic model can be extracted.

In the foregoing, the invention made by the inventors of the present invention has been concretely described based on the embodiments. However, it is needless to say that the present invention is not limited to the foregoing embodiments and various modifications and alterations can be made within the scope of the present invention.

Industrial Applicability

The present invention can be used in an apparatus abnormality monitoring system, an apparatus maintenance system, and others.

The invention claimed is:

1. An apparatus abnormality monitoring method in which, with using information processing of a computer and taking a plurality of (K+1) similar apparatuses as process targets, based on a plurality of data items of each of the apparatuses obtained by measuring states of the apparatuses with sensors, processes for monitoring and judging an abnormality of a state of at least one of the plurality of (K+1) apparatuses are performed, among the plurality of (K+1) apparatuses, one first apparatus being taken as a target for monitoring and judgment, and a plurality of (K) other second apparatuses being taken as targets for obtaining data for producing a first model for monitoring and judging the first apparatus, the method comprising: a first step of performing a process of producing the first model dedicated to the first apparatus based on a plurality of (K) prediction models dedicated to the individual second apparatuses for monitoring and judgment, the prediction models being created based on a plurality of data items at a time of normal condition in each of the plurality of (K) second apparatuses; and a second step of performing a monitoring execution process of inputting a plurality of data items from the first apparatus per predetermined unit time, monitoring and judging an abnormality of the state of the first apparatus by using the first model, and outputting detection information when an abnormality is detected, wherein the first step includes: a step of classifying the plurality of data items of each of the plurality of (K) second apparatuses into an objective variable and other explanatory variables in regression analysis;

a step of creating a plurality of (K) regression models as individual prediction models of the plurality of (K) second apparatuses;

a step of creating a similar-apparatus common meta prediction model which predicts a coefficient and an intercept of each of the plurality of (K) regression models from a feature item value or an installation environment measurement value of each of the second apparatuses; and a step of inputting a feature item value or an installation environment measurement value of the first apparatus to the meta prediction model and producing a coefficient and an intercept of a regression model as the first model, thereby producing the first model, and the second step includes: a step of inputting an explanatory variable in the plurality of data items of the first apparatus to the first model and calculating a predicted value of an objective variable of the first apparatus;

a step of calculating a deviance between a measurement value of the objective variable of the first apparatus and the predicted value of the objective variable of the first apparatus; and a step of detecting an abnormality of the first apparatus by comparing the deviance and a threshold.

2. The apparatus abnormality monitoring method according to claim 1, wherein the first step includes: a step of classifying the explanatory variables into collinearity explanatory variables with a large mutual correlation strength and other independence explanatory variable, in the step of creating the plurality of (K) regression models, for each of the collinearity explanatory variables, an ensemble of regression models for predicting the objective variable from the one collinearity explanatory variable and the other independence explanatory variable is created, in the step of creating the meta prediction model, for the ensemble of the regression models, a meta prediction model for predicting a coefficient and an intercept of the regression models for each of the collinearity explanatory variables is created, in the step of producing the first model, a coefficient and an intercept of a regression model of the plurality of individual prediction models are produced for each of the explanatory variables of the first apparatus, and the second step includes: a step of calculating an ensemble deviance formed by combining one or more deviances obtained for each of the collinearity explanatory variables, in the step of calculating the predicted value of the objective variable of the first apparatus, the collinearity explanatory variable and the other independence explanatory variable are inputted to the first model to calculate an ensemble of predicted values of the objective variable of the first apparatus, in the step of calculating the deviance, an ensemble of the deviances is calculated for the ensemble of the predicted values, and in the step of detecting an abnormality of the apparatus, an ensemble deviance formed by combining one or more deviances included in the ensemble of the deviances and a threshold are compared with each other to detect an abnormality of the first apparatus.

3. An apparatus abnormality monitoring method in which, with using information processing of a computer and taking a plurality of (K+1) similar apparatuses as process targets, based on a plurality of data items of each of the apparatuses obtained by measuring states of the apparatuses with sensors, processes for diagnosing a cause of an abnormality of at least one of the plurality of apparatuses are performed, among the plurality of (K+1) apparatuses, one first apparatus being taken as a target for cause diagnosis, and a plurality of (K) other second apparatuses being taken as targets for obtaining data for producing a second model for the cause diagnosis of the first apparatus, the method comprising: a first step of creating and accumulating individual diagnostic models of the plurality of (K) apparatuses based on an abnormality cause diagnosis of the plurality of (K) apparatuses, and producing the second model for the cause diagnosis of the first apparatus based on the plurality of (K) individual diagnostic models; and a second step of inputting a plurality of data items of the first apparatus per predetermined time unit, monitoring and judging an abnormality of the state of the first apparatus, and performing a cause diagnosing process by using the second model when an abnormality is detected, wherein the first step includes: a step of creating individual diagnostic models of the plurality of (K) second apparatuses and accumulating the diagnostic models together with a feature item value or an installation environment measurement value of each of the second apparatuses;

a step of creating a similar-apparatus common meta diagnostic model obtained by classifying the plurality of (K) accumulated individual diagnostic models based on the feature item value or the installation environment measurement value of each of the second apparatuses; and a step of inputting a feature item value or an installation environment measurement value of the first apparatus to the meta diagnostic model and producing the second model dedicated to the first apparatus, and the second step includes: a step of, when the abnormality is detected, inputting data items from the first apparatus to the second model and performing matching with each of the models constituting the second model; and a step of outputting information about a cause based on the matched models.

4. The apparatus abnormality monitoring method according to claim 3, wherein the second model is taken as a graphical model in which a relation among the plurality of data items is represented in a directed graph, and in the first step, a process of determining presence or absence or a strength of a link of the graphical model by a correlation strength, a partial correlation strength, or a product of the partial correlation strength and a signal strength and a process of determining a direction of the link from time precedence information among the data items are performed.

5. An apparatus abnormality monitoring system in which, with using information processing of a computer and taking a plurality of (K+1) similar apparatuses as process targets, based on a plurality of data items of each of the apparatuses obtained by measuring states of the apparatuses with sensors, processes for monitoring and judging an abnormality of a state of at least one of the plurality of (K+1) apparatuses are performed, among the plurality of (K+1) apparatuses, one first apparatus being taken as a target for monitoring and judgment, and a plurality of (K) other second apparatuses being taken as targets for obtaining data for producing a first model for monitoring and judging the first apparatus, the system comprising: a first computer which performs a process of producing the first model dedicated to the first apparatus based on a plurality of (K) prediction models dedicated to the individual second apparatuses for monitoring and judgment, the prediction models being created based on a plurality of data items at a time of normal condition in each of the plurality of (K) second apparatuses; and a second computer which performs a monitoring execution process of inputting a plurality of data items from the first apparatus per predetermined unit time, monitoring and judging an abnormality of the state of the first apparatus by using the first model, and outputting detection information when an abnormality is detected, wherein the first computer performs: a process of classifying the plurality of data items of each of the plurality of (K) second apparatuses into an objective variable and other explanatory variables in regression analysis;

a process of creating a plurality of (K) regression models as individual prediction models of the plurality of (K) second apparatuses; a process of creating a similar-apparatus common meta prediction model which predicts a coefficient and an intercept of each of the plurality of (K) regression models from a feature item value or an installation environment measurement value of each of the second apparatuses; and a process of inputting a feature item value or an installation environment measurement value of the first apparatus to the meta prediction model and producing a coefficient and an intercept of a regression model as the first model, thereby producing the first model, and the second computer performs: a process of inputting an explanatory variable in the plurality of data items of the first apparatus to the first model and calculating a predicted value of an objective variable of the first apparatus;

a process of calculating a deviance between a measurement value of the objective variable of the first apparatus and the predicted value of the objective variable of the first apparatus; and a process of detecting an abnormality of the first apparatus by comparing the deviance and a threshold.

6. The apparatus abnormality monitoring system according to claim 5, wherein the first computer performs a process of classifying the explanatory variables into collinearity explanatory variables with a large mutual correlation strength and other independence explanatory variable, in the process of creating the plurality of (K) regression models, for each of the collinearity explanatory variables, an ensemble of regression models for predicting the objective variable from the one collinearity explanatory variable and the other independence explanatory variable is created, in the process of creating the meta prediction model, for the ensemble of the regression models, a meta prediction model for predicting a coefficient and an intercept of the regression models for each of the collinearity explanatory variables is created, in the process of producing the first model, a coefficient and an intercept of a regression model of the plurality of individual prediction models are produced for each of the explanatory variables of the first apparatus, and the second computer performs a process of calculating an ensemble deviance formed by combining one or more deviances obtained for each of the collinearity explanatory variables, in the process of calculating the predicted value of the objective variable of the first apparatus, the collinearity explanatory variable and the other independence explanatory variable are inputted to the first model to calculate an ensemble of predicted values of the objective variable of the first apparatus, in the process of calculating the deviance, an ensemble of the deviances is calculated for the ensemble of the predicted values, and in the process of detecting an abnormality of the apparatus, an ensemble deviance formed by combining one or more deviances included in the ensemble of the deviances and a threshold are compared with each other to detect an abnormality of the first apparatus.

7. An apparatus abnormality monitoring system in which, with using information processing of a computer and taking a plurality of (K+1) similar apparatuses as process targets, based on a plurality of data items of each of the apparatuses obtained by measuring states of the apparatuses with sensors, processes for diagnosing a cause of an abnormality of at least one of the plurality of apparatuses are performed, among the plurality of (K+1) apparatuses, one first apparatus being taken as a target for cause diagnosis, and a plurality of (K) other second apparatuses being taken as targets for obtaining data for producing a second model for the cause diagnosis of the first apparatus, the system comprising: a first computer which creates and accumulates individual diagnostic models of the plurality of (K) apparatuses based on an abnormality cause diagnosis of the plurality of (K) apparatuses, and produces the second model for the cause diagnosis of the first apparatus based on the plurality of (K) individual diagnostic models; and a second computer which inputs a plurality of data items of the first apparatus per predetermined time unit, monitors and judges an abnormality of the state of the first apparatus, and performs a cause diagnosing process by using the second model when an abnormality is detected, wherein the first computer performs: a process of creating individual diagnostic models of the plurality of (K) second apparatuses and accumulating the diagnostic models together with a feature item value or an installation environment measurement value of each of the second apparatuses;

a process of creating a similar-apparatus common meta diagnostic model obtained by classifying the plurality of (K) accumulated individual diagnostic models based on the feature item value or the installation environment measurement value of each of the second apparatuses; and a process of inputting a feature item value or an installation environment measurement value of the first apparatus to the meta diagnostic model and producing the second model dedicated to the first apparatus, and the second computer performs: a process of, when the abnormality is detected, inputting data items from the first apparatus to the second model and performing matching with each of the models constituting the second model; and a process of outputting information about a cause based on the matched models.

8. The apparatus abnormality monitoring system according to claim 7, wherein the second model is taken as a graphical model in which a relation among the plurality of data items is represented in a directed graph, and the first computer performs a process of determining presence or absence or a strength of a link of the graphical model by a correlation strength, a partial correlation strength, or a product of the partial correlation strength and a signal strength and a process of determining a direction of the link from time precedence information among the data items.

\* \* \* \* \*